(12) United States Patent
Wu et al.

(10) Patent No.: US 11,211,980 B2
(45) Date of Patent: Dec. 28, 2021

(54) COMMUNICATION METHOD, NETWORK DEVICE, TERMINAL DEVICE, AND SYSTEM

(71) Applicant: HUAWEI TECHNOLOGIES CO., LTD., Guangdong (CN)

(72) Inventors: Ye Wu, Shanghai (CN); Huangping Jin, Shanghai (CN); Wei Han, Shanghai (CN); Xiaoyan Bi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/812,658

(22) Filed: Mar. 9, 2020

(65) Prior Publication Data
US 2020/0212974 A1 Jul. 2, 2020

Related U.S. Application Data

(63) Continuation of application No. PCT/CN2018/101274, filed on Aug. 20, 2018.

(30) Foreign Application Priority Data

Sep. 11, 2017 (CN) .......................... 201710814311.5

(51) Int. Cl.
*H04B 7/0456* (2017.01)
*H04B 7/0417* (2017.01)
(Continued)

(52) U.S. Cl.
CPC ......... *H04B 7/0486* (2013.01); *H04B 7/0417* (2013.01); *H04B 7/0469* (2013.01);
(Continued)

(58) Field of Classification Search
CPC .................................................. H04B 7/0486
(Continued)

(56) References Cited

U.S. PATENT DOCUMENTS 9,654,264 B2    5/2017  Athley et al.
10,498,513 B2  12/2019  Marinier et al.
(Continued)

FOREIGN PATENT DOCUMENTS

CN    102082639 A     6/2011
CN    102833053 A    12/2012
(Continued)

*Primary Examiner* — Lihong Yu
(74) *Attorney, Agent, or Firm* — Womble Bond Dickinson (US) LLP

(57) ABSTRACT

This application provides a communication method, a communications apparatus, and a system. The method may include receiving, by a terminal device, a first group of precoded reference signals and a second group of precoded reference signals. The method may also include feeding back first indication information based on a channel state information (CSI) feedback-based transmission scheme, where the first indication information is used to determine a plurality of precoding vectors, at least one of the plurality of precoding vectors is determined by using the first group of precoded reference signals, and at least one of the plurality of precoding vectors is determined by using the second group of precoded reference signals.

18 Claims, 7 Drawing Sheets

(51) Int. Cl.
*H04B 7/06* (2006.01)
*H04L 5/00* (2006.01)

(52) U.S. Cl.
CPC ......... *H04B 7/0626* (2013.01); *H04B 7/0634* (2013.01); *H04B 7/0639* (2013.01); *H04L 5/0051* (2013.01)

(58) Field of Classification Search
USPC ....................................................... 370/329
See application file for complete search history.

(56) References Cited

U.S. PATENT DOCUMENTS

| | | | |
|---|---|---|---|
| 2006/0067421 A1* | 3/2006 | Walton .................. | H04L 1/0606 375/267 |
| 2010/0284484 A1* | 11/2010 | Jongren .................. | H04B 7/10 375/267 |
| 2012/0113934 A1* | 5/2012 | Ko ........................ | H04L 5/0023 370/329 |
| 2013/0308715 A1 | 11/2013 | Nam et al. | |
| 2014/0177745 A1* | 6/2014 | Krishnamurthy .... | H04B 7/0413 375/267 |
| 2015/0124688 A1 | 5/2015 | Xu et al. | |
| 2017/0134082 A1 | 5/2017 | Onggosanusi et al. | |
| 2017/0181132 A1 | 6/2017 | Xiao et al. | |
| 2017/0244533 A1 | 8/2017 | Onggosanusi et al. | |
| 2017/0257884 A1 | 9/2017 | Rahman et al. | |
| 2018/0205437 A1 | 7/2018 | Kim et al. | |
| 2019/0109683 A1* | 4/2019 | Kimura ................ | H04L 1/1819 |
| 2019/0386720 A1 | 12/2019 | Qian et al. | |
| 2020/0186208 A1 | 6/2020 | Mol s Cases et al. | |

FOREIGN PATENT DOCUMENTS

| | | |
|---|---|---|
| CN | 104218982 A | 12/2014 |
| CN | 104396153 A | 3/2015 |
| CN | 106160925 A | 11/2016 |
| CN | 106559121 A | 4/2017 |
| CN | 106685582 A | 5/2017 |
| EP | 3331172 A1 | 6/2018 |
| WO | 2014182002 A1 | 11/2014 |
| WO | 2014194479 A1 | 12/2014 |
| WO | 2016008163 A1 | 1/2016 |
| WO | 2016080742 A1 | 5/2016 |
| WO | 2017020749 A1 | 2/2017 |
| WO | 2017028007 A1 | 2/2017 |

* cited by examiner

COMMUNICATION METHOD, NETWORK DEVICE, TERMINAL DEVICE, AND SYSTEM

CROSS-REFERENCE TO RELATED APPLICATIONS

This application is a continuation of International Application No. PCT/CN2018/101274, filed on Aug. 20, 2018, which claims priority to Chinese Patent Application No. 201710814311.5, filed on Sep. 11, 2017. The disclosures of the aforementioned applications are hereby incorporated by reference in their entireties.

TECHNICAL FIELD

This application relates to the field of wireless communication, and more specifically, to a communication method, a network device, a terminal device, and a system.

BACKGROUND

Massive multiple-input multiple-output (MIMO) is one of industry-accepted key technologies of 5th generation mobile communications (5G). To avoid interference among a plurality of users and improve signal quality, a signal may be usually processed through precoding, to implement spatial multiplexing, and greatly improve spectrum utilization.

To improve reliability of data transmission, some transmission schemes are known currently, and a diversity gain is obtained by using a diversity transmission method. In a possible design, a transmit end may process signals (for example, including a demodulation reference signal (DMRS) and a data signal) by using precoding vectors corresponding to different polarization directions, to obtain a higher space diversity gain. This transmission scheme may be referred to as a polarization direction-based diversity transmission scheme.

In prior approaches, when performing channel measurement, a receive end usually traverses, after determining a rank, precoding matrices corresponding to a plurality of precoding matrix indicators (PMI) in the same rank to perform channel measurement, so as to obtain an optimal PMI in a measurement criterion and feed back or indicate the optimal PMI to a transmit end. However, for example, when data is transmitted by using the foregoing polarization direction-based diversity transmission scheme, complexity of this channel measurement method is relatively high.

SUMMARY

This application provides a communication method, a network device, a terminal device, and a system, to perform channel measurement based on different transmission schemes. This may reduce complexity of the channel measurement, thereby improving efficiency of the channel measurement.

According to a first aspect, a communication method is provided. The method includes:
receiving, by a terminal device, a first group of precoded reference signals and a second group of precoded reference signals, where the first group of precoded reference signals includes at least one precoded reference signal, and the second group of precoded reference signals includes at least one precoded reference signal; and feeding back, by the terminal device, first indication information based on a channel state information (CSI) feedback-based transmission scheme, where the first indication information is used to determine a plurality of precoding vectors, at least one of the plurality of precoding vectors is determined by using a precoding vector corresponding to at least one of the first group of precoded reference signals, and at least one of the plurality of precoding vectors is determined by using a precoding vector corresponding to at least one of the second group of precoded reference signals, where the first indication information is used to indicate a first element in a codebook, the first element is used to determine at least one port, each port indicates a precoding vector corresponding to one precoded reference signal, at least one candidate element including the first element is predefined in a codebook corresponding to a same rank, and when a quantity of the at least one candidate element is at least 2, ports indicated by any two of the at least one candidate element are at least partially different.

Therefore, according to the communication method provided in this embodiment of this application, the terminal device feeds back a plurality of precoding vectors based on the feedback-based transmission scheme, and the plurality of precoding vectors may be corresponding to at least one of the first group of precoded reference signals and at least one of the second group of precoded reference signals. Compared with feedback of only one precoding vector in prior approaches, this better meets a requirement of a diversity transmission scheme, and can provide, for the diversity transmission scheme, the plurality of precoding vectors used for data transmission, to obtain a space diversity gain. This helps improve data transmission reliability, thereby helping improve robustness of a communications system. In addition, by restricting some elements in an existing codebook, the terminal device performs channel measurement based on a candidate element set. This helps reduce complexity of the channel measurement and improve efficiency of the channel measurement.

It should be understood that, in the embodiments of this application, the terminal device is not limited to receiving two groups of precoded reference signals, in other words, the network device is not limited to sending two groups of precoded reference signals. The network device may send a plurality of groups of precoded reference signals based on different grouping mechanisms such as different polarization directions or different antenna panels. The terminal device may feed back a plurality of precoding vectors based on the received plurality of groups of precoded reference signals. Any one of the plurality of precoding vectors is corresponding to at least one of a group of precoded reference signals.

With reference to the first aspect, in some embodiments of the first aspect, when the rank is greater than 1, in the codebook corresponding to the same rank, any candidate element includes a plurality of column vectors, each of the plurality of column vectors is used to indicate at least two ports, and ports indicated by any two column vectors in a same candidate element are at least partially different.

Column vectors in a same candidate element are restricted, so that precoding vectors used for precoding on different data layers are different, to avoid interference between two data layers, and ensure data transmission reliability.

With reference to the first aspect, in some embodiments of the first aspect, the first group of precoded reference signals is corresponding to a first polarization direction, and the second group of precoded reference signals is corresponding to a second polarization direction.

Therefore, the plurality of precoding vectors may be divided into two groups, where the first group of precoding vectors is corresponding to the first polarization direction, and the second group of precoding vectors is corresponding to the second polarization direction. In other words, the plurality of precoding vectors are precoding vectors based on different polarization directions, and better meet a requirement of a polarization direction-based diversity transmission scheme. This helps maximize a space diversity gain, provide data transmission reliability, and improve robustness of the communications system.

With reference to the first aspect, in some embodiments of the first aspect, the first indication information is a first precoding matrix indicator PMI, and a one-to-one correspondence between at least one PMI and the at least one candidate element is prestored in the codebook.

In this embodiment of this application, the one-to-one correspondence between the PMI and the candidate element may still use a one-to-one correspondence between a PMI and an element in an existing LTE protocol codebook, or a PMI may be redefined for the candidate element, to reduce PMI overheads.

If the PMI is redefined for the candidate element, the following bit usage of the PMI may be obtained:

Optionally, if the codebook is a codebook of two antenna ports, when the rank is 1, a quantity of PMIs is 1; or when the rank is 2, a quantity of PMIs is 1, and a quantity of bits of the PMI is 1.

Optionally, if the codebook is a codebook of four antenna ports, when the rank is 1, a quantity of PMIs is 2; or when the rank is 2, a quantity of PMIs is 1, and a quantity of bits of the PMI is 1.

Optionally, if the codebook is a codebook of eight antenna ports, when the rank is 1, a quantity of PMIs is 4; or when the rank is 2, a quantity of PMIs is 4, and a quantity of bits of the PMI is 2.

With reference to the first aspect, in some embodiments of the first aspect, each column vector in the first element indicated by the first PMI is used to indicate at least two of the plurality of precoding vectors, one of the at least two precoding vectors is corresponding to one of the first group of precoded reference signals, and another one of the at least two precoding vectors is corresponding to one of the second group of precoded reference signals.

In other words, two groups of precoding vectors determined by using the two groups of precoded reference signals are indicated by using one PMI. This is a joint feedback method.

With reference to the first aspect, in some embodiments of the first aspect, the method further includes:

receiving, by the terminal device, second indication information, where the second indication information indicates the CSI feedback-based transmission scheme.

The terminal device may perform channel measurement based on the CSI feedback-based transmission scheme indicated by the second indication information, and determine a candidate element set according to a predefined rule, so that the terminal device performs channel measurement by using a relatively small codebook. This method may be understood as a method for implicitly indicating the candidate element set.

With reference to the first aspect, in some embodiments of the first aspect, the method further includes:

receiving, by the terminal device, third indication information, where the third indication information indicates the at least one candidate element.

The at least one candidate element is the foregoing candidate element set. The network device may explicitly indicate the candidate element set to the terminal device by directly sending the third indication information, so that the terminal device performs channel measurement based on the candidate element set.

According to a second aspect, a communication method is provided. The method includes:

sending, by a network device, a first group of precoded reference signals and a second group of precoded reference signals, where the first group of precoded reference signals includes at least one precoded reference signal, and the second group of precoded reference signals includes at least one precoded reference signal; and receiving, by the network device, first indication information fed back by a terminal device, where the first indication information is used to determine a plurality of precoding vectors, at least one of the plurality of precoding vectors is determined by using a precoding vector corresponding to at least one of the first group of precoded reference signals, and at least one of the plurality of precoding vectors is determined by using a precoding vector corresponding to at least one of the second group of precoded reference signals, where the first indication information is used to indicate a first element in a codebook, the first element is used to determine at least one port, each port indicates a precoding vector corresponding to one precoded reference signal, at least one candidate element including the first element is predefined in a codebook corresponding to a same rank, and when a quantity of the at least one candidate element is at least 2, ports indicated by any two of the at least one candidate element are at least partially different.

Therefore, according to the communication method provided in this embodiment of this application, the terminal device feeds back a plurality of precoding vectors based on a CSI feedback-based transmission scheme, and the plurality of precoding vectors may be corresponding to at least one of the first group of precoded reference signals and at least one of the second group of precoded reference signals. Compared with feedback of only one precoding vector in prior approaches, this better meets a requirement of a diversity transmission scheme, and can provide, for the diversity transmission scheme, the plurality of precoding vectors used for data transmission, to obtain a space diversity gain. This helps improve data transmission reliability, thereby helping improve robustness of a communications system. In addition, by restricting some elements in an existing codebook, the terminal device performs channel measurement based on a candidate element set. This helps reduce complexity of the channel measurement and improve efficiency of the channel measurement.

It should be understood that, in the embodiments of this application, the terminal device is not limited to receiving two groups of precoded reference signals, in other words, the network device is not limited to sending two groups of precoded reference signals. The network device may send a plurality of groups of precoded reference signals based on different grouping mechanisms such as different polarization directions or different antenna panels. The terminal device may feed back a plurality of precoding vectors based on the received plurality of groups of precoded reference signals. Any one of the plurality of precoding vectors is corresponding to at least one of a group of precoded reference signals.

With reference to the second aspect, in some embodiments of the second aspect, when the rank is greater than 1, in the codebook corresponding to the same rank, any candidate element includes a plurality of column vectors, each of the plurality of column vectors is used to indicate at least two ports, and ports indicated by any two column vectors in a same candidate element are at least partially different.

Column vectors in a same candidate element are restricted, so that precoding vectors used for precoding on different data layers are different, to avoid interference between two data layers, and ensure data transmission reliability.

With reference to the second aspect, in some embodiments of the second aspect, the first group of precoded reference signals is corresponding to a first polarization direction, and the second group of precoded reference signals is corresponding to a second polarization direction.

Therefore, the plurality of precoding vectors may be divided into two groups, where the first group of precoding vectors is corresponding to the first polarization direction, and the second group of precoding vectors is corresponding to the second polarization direction. In other words, the plurality of precoding vectors are precoding vectors based on different polarization directions, and better meet a requirement of a polarization direction-based diversity transmission scheme. This helps maximize a space diversity gain, provide data transmission reliability, and improve robustness of the communications system.

With reference to the second aspect, in some embodiments of the second aspect, the first indication information is a first precoding matrix indicator PMI, and a one-to-one correspondence between at least one PMI and the at least one candidate element is prestored in the codebook.

In this embodiment of this application, the one-to-one correspondence between the PMI and the candidate element may still use a one-to-one correspondence between a PMI and an element in an existing LTE protocol codebook, or a PMI may be redefined for the candidate element, to reduce PMI overheads.

If the PMI is redefined for the candidate element, the following bit usage of the PMI may be obtained:

Optionally, if the codebook is a codebook of two antenna ports, when the rank is 1, a quantity of PMIs is 1; or when the rank is 2, a quantity of PMIs is 1, and a quantity of bits of the PMI is 1.

Optionally, if the codebook is a codebook of four antenna ports, when the rank is 1, a quantity of PMIs is 2; or when the rank is 2, a quantity of PMIs is 1, and a quantity of bits of the PMI is 1.

Optionally, if the codebook is a codebook of eight antenna ports, when the rank is 1, a quantity of PMIs is 4; or when the rank is 2, a quantity of PMIs is 4, and a quantity of bits of the PMI is 2.

With reference to the second aspect, in some embodiments of the second aspect, each column vector in the first element indicated by the first PMI is used to indicate at least two of the plurality of precoding vectors, one of the at least two precoding vectors is corresponding to one of the first group of precoded reference signals, and another one of the at least two precoding vectors is corresponding to one of the second group of precoded reference signals.

In other words, two groups of precoding vectors determined by using the two groups of precoded reference signals are indicated by using one PMI. This is a joint feedback method.

With reference to the second aspect, in some embodiments of the second aspect, the method further includes:

sending, by the network device, second indication information, where the second indication information indicates the CSI feedback-based transmission scheme.

Based on the second indication information, the terminal device may perform channel measurement based on the CSI feedback-based transmission scheme indicated by the second indication information, and determine a candidate element set according to a predefined rule, so that the terminal device performs channel measurement by using a relatively small codebook. This method may be understood as a method for implicitly indicating the candidate element set.

With reference to the second aspect, in some embodiments of the second aspect, the method further includes:

sending, by the network device, third indication information, where the third indication information indicates the at least one candidate element.

The at least one candidate element is the foregoing candidate element set. The network device may explicitly indicate the candidate element set to the terminal device by directly sending the third indication information, so that the terminal device performs channel measurement based on the candidate element set.

According to a third aspect, a communication method is provided. The method includes:

sending, by a terminal device, a third group of precoded reference signals and a fourth group of precoded reference signals, where the third group of precoded reference signals includes at least one precoded reference signal, and the fourth group of precoded reference signals includes at least one precoded reference signal;

receiving, by the terminal device, fourth indication information from a network device; and determining, by the terminal device, a plurality of precoding vectors based on the fourth indication information, where at least one of the plurality of precoding vectors is determined by using a precoding vector corresponding to at least one of the third group of precoded reference signals, and at least one of the plurality of precoding vectors is determined by using a precoding vector corresponding to at least one of the fourth group of precoded reference signals, where the fourth indication information is used to indicate a second element in a codebook, the second element is used to determine at least one port, each port indicates a precoding vector corresponding to one precoded reference signal, at least one candidate element including the second element is predefined in a codebook corresponding to a same rank, and when a quantity of the at least one candidate element is at least 2, ports indicated by any two of the at least one candidate element are at least partially different.

Therefore, according to the communication method provided in this embodiment of this application, the network device indicates a plurality of precoding vectors based on a CSI measurement-based transmission scheme, and the plurality of precoding vectors may be corresponding to at least one of the third group of precoded reference signals and at least one of the fourth group of precoded reference signals. Compared with feedback of only one precoding vector in prior approaches, this better meets a requirement of a diversity transmission scheme, and can provide, for the diversity transmission scheme, the plurality of precoding vectors used for data transmission, to obtain a space diversity gain. This helps improve data transmission reliability, thereby helping improve robustness of a communications system. In addition, by restricting some elements in an existing codebook, the terminal device performs channel measurement based on a candidate element set. This helps reduce complexity of the channel measurement and improve efficiency of the channel measurement.

It should be understood that, in the embodiments of this application, the terminal device is not limited to sending two groups of precoded reference signals, in other words, the network device is not limited to receiving two groups of precoded reference signals. The terminal device may send a plurality of groups of precoded reference signals based on different grouping mechanisms such as different polarization directions or different antenna panels. The network device may indicate a plurality of precoding vectors based on the received plurality of groups of precoded reference signals. Any one of the plurality of precoding vectors is corresponding to at least one of a group of precoded reference signals.

Optionally, when the rank is greater than 1, in the codebook corresponding to the same rank, any candidate element includes a plurality of column vectors, each of the plurality of column vectors is used to indicate at least two ports, and ports indicated by any two column vectors in a same candidate element are at least partially different.

Column vectors in a same candidate element are restricted, so that precoding vectors used for precoding on different data layers are different, to avoid interference between two data layers, and ensure data transmission reliability.

Optionally, the third group of precoded reference signals is corresponding to a first polarization direction, and the fourth group of precoded reference signals is corresponding to a second polarization direction.

Therefore, the plurality of precoding vectors may be divided into two groups, where the third group of precoding vectors is corresponding to the first polarization direction, and the fourth group of precoding vectors is corresponding to the second polarization direction. In other words, the plurality of precoding vectors are precoding vectors based on different polarization directions, and better meet a requirement of a polarization direction-based diversity transmission scheme. This helps maximize a space diversity gain, provide data transmission reliability, and improve robustness of the communications system.

Optionally, the fourth indication information is a second precoding matrix indicator PMI, and a one-to-one correspondence between at least one PMI and the at least one candidate element is prestored in the codebook.

In this embodiment of this application, the one-to-one correspondence between the PMI and the candidate element may still use a one-to-one correspondence between a PMI and an element in an existing LTE protocol codebook, or a PMI may be redefined for the candidate element, to reduce PMI overheads.

If the PMI is redefined for the candidate element, the following bit usage of the PMI may be obtained:

Optionally, if the codebook is a codebook of two antenna ports, when the rank is 1, a quantity of PMIs is 1; or when the rank is 2, a quantity of PMIs is 1, and a quantity of bits of the PMI is 1.

Optionally, if the codebook is a codebook of four antenna ports, when the rank is 1, a quantity of PMIs is 2; or when the rank is 2, a quantity of PMIs is 1, and a quantity of bits of the PMI is 1.

Optionally, if the codebook is a codebook of eight antenna ports, when the rank is 1, a quantity of PMIs is 4; or when the rank is 2, a quantity of PMIs is 4, and a quantity of bits of the PMI is 2.

Optionally, each column vector in the second element indicated by the PMI is used to indicate at least two of the plurality of precoding vectors, one of the at least two precoding vectors is corresponding to one of the third group of precoded reference signals, and another one of the at least two precoding vectors is corresponding to one of the fourth group of precoded reference signals.

In other words, two groups of precoding vectors determined by using the two groups of precoded reference signals are indicated by using one PMI. This is a joint feedback method.

Optionally, the method further includes: receiving, by the terminal device, fifth indication information, where the fifth indication information indicates a CSI measurement-based transmission scheme.

The terminal device may perform channel measurement based on the CSI measurement-based transmission scheme indicated by the fifth indication information, and also determine a candidate element set according to a predefined rule, so that the terminal device and the network device determine, based on a same codebook, the plurality of precoding vectors indicated by the network device by using the fourth indication information. This method may be understood as a method for implicitly indicating the candidate element set.

Optionally, the method further includes: receiving, by the terminal device, sixth indication information, where the sixth indication information indicates the at least one candidate element.

The at least one candidate element is the foregoing candidate element set. The network device may explicitly indicate the candidate element set to the terminal device by directly sending the sixth indication information, so that the terminal device determines the plurality of precoding vectors based on the candidate element set and the fourth indication information sent by the network device.

According to a fourth aspect, a communication method is provided. The method includes:

receiving, by a network device, a third group of precoded reference signals and a fourth group of precoded reference signals, where the third group of precoded reference signals includes at least one precoded reference signal, and the fourth group of precoded reference signals includes at least one precoded reference signal; and sending, by the network device, fourth indication information based on a CSI measurement-based transmission scheme, where the fourth indication information is used to determine a plurality of precoding vectors, at least one of the plurality of precoding vectors is determined by using a precoding vector corresponding to at least one of the third group of precoded reference signals, and at least one of the plurality of precoding vectors is determined by using a precoding vector corresponding to at least one of the fourth group of precoded reference signals, where the fourth indication information is used to indicate a second element in a codebook, the second element is used to determine at least one port, each port indicates a precoding vector corresponding to one precoded reference signal, at least one candidate element including the second element is predefined in a codebook corresponding to a same rank, and when a quantity of the at least one candidate element is at least 2, ports indicated by any two of the at least one candidate element are at least partially different.

Therefore, according to the communication method provided in this embodiment of this application, the network device indicates a plurality of precoding vectors based on the CSI measurement-based transmission scheme, and the plurality of precoding vectors may be corresponding to at least one of the third group of precoded reference signals and at least one of the fourth group of precoded reference signals. Compared with feedback of only one precoding vector in prior approaches, this better meets a requirement of a diversity transmission scheme, and can provide, for the diversity transmission scheme, the plurality of precoding vectors used for data transmission, to obtain a space diversity gain. This helps improve data transmission reliability, thereby helping improve robustness of a communications system. In addition, by restricting some elements in an existing codebook, a terminal device performs channel measurement based on a candidate element set. This helps reduce complexity of the channel measurement and improve efficiency of the channel measurement.

It should be understood that, in the embodiments of this application, the terminal device is not limited to sending two groups of precoded reference signals, in other words, the network device is not limited to receiving two groups of precoded reference signals. The terminal device may send a plurality of groups of precoded reference signals based on different grouping mechanisms such as different polarization directions or different antenna panels. The network device may indicate a plurality of precoding vectors based on the received plurality of groups of precoded reference signals. Any one of the plurality of precoding vectors is corresponding to at least one of a group of precoded reference signals.

Optionally, when the rank is greater than 1, in the codebook corresponding to the same rank, any candidate element includes a plurality of column vectors, each of the plurality of column vectors is used to indicate at least two ports, and ports indicated by any two column vectors in a same candidate element are at least partially different.

Column vectors in a same candidate element are restricted, so that precoding vectors used for precoding on different data layers are different, to avoid interference between two data layers, and ensure data transmission reliability.

Optionally, the third group of precoded reference signals is corresponding to a first polarization direction, and the fourth group of precoded reference signals is corresponding to a second polarization direction.

Therefore, the plurality of precoding vectors may be divided into two groups, where the third group of precoding vectors is corresponding to the first polarization direction, and the fourth group of precoding vectors is corresponding to the second polarization direction. In other words, the plurality of precoding vectors are precoding vectors based on different polarization directions, and better meet a requirement of a polarization direction-based diversity transmission scheme. This helps maximize a space diversity gain, provide data transmission reliability, and improve robustness of the communications system.

Optionally, the fourth indication information is a second precoding matrix indicator PMI, and a one-to-one correspondence between at least one PMI and the at least one candidate element is prestored in the codebook.

In this embodiment of this application, the one-to-one correspondence between the PMI and the candidate element may still use a one-to-one correspondence between a PMI and an element in an existing LTE protocol codebook, or a PMI may be redefined for the candidate element, to reduce PMI overheads.

If the PMI is redefined for the candidate element, the following bit usage of the PMI may be obtained:

Optionally, if the codebook is a codebook of two antenna ports, when the rank is 1, a quantity of PMIs is 1; or when the rank is 2, a quantity of PMIs is 1, and a quantity of bits of the PMI is 1.

Optionally, if the codebook is a codebook of four antenna ports, when the rank is 1, a quantity of PMIs is 2; or when the rank is 2, a quantity of PMIs is 1, and a quantity of bits of the PMI is 1.

Optionally, if the codebook is a codebook of eight antenna ports, when the rank is 1, a quantity of PMIs is 4; or when the rank is 2, a quantity of PMIs is 4, and a quantity of bits of the PMI is 2.

Optionally, each column vector in the second element indicated by the PMI is used to indicate at least two of the plurality of precoding vectors, one of the at least two precoding vectors is corresponding to one of the third group of precoded reference signals, and another one of the at least two precoding vectors is corresponding to one of the fourth group of precoded reference signals.

In other words, two groups of precoding vectors determined by using the two groups of precoded reference signals are indicated by using one PMI. This is a joint feedback method.

Optionally, the method further includes: sending, by the network device, fifth indication information, where the fifth indication information indicates the CSI measurement-based transmission scheme.

Therefore, the terminal device may perform channel measurement based on the CSI measurement-based transmission scheme indicated by the fifth indication information, and also determine a candidate element set according to a predefined rule, so that the terminal device and the network device determine, based on a same codebook, the plurality of precoding vectors indicated by the network device by using the fourth indication information. This method may be understood as a method for implicitly indicating the candidate element set.

Optionally, the method further includes: sending, by the network device, sixth indication information, where the sixth indication information indicates the at least one candidate element.

The at least one candidate element is the foregoing candidate element set. The network device may explicitly indicate the candidate element set to the terminal device by directly sending the sixth indication information, so that the terminal device determines the plurality of precoding vectors based on the candidate element set and the fourth indication information sent by the network device.

According to a fifth aspect, a terminal device is provided. The terminal device includes modules configured to perform the communication method according to any one of the first aspect or the possible embodiments of the first aspect, or modules configured to perform the communication method according to any one of the third aspect or the possible embodiments of the third aspect.

According to a sixth aspect, a network device is provided. The network device includes modules configured to perform the communication method according to any one of the second aspect or the possible embodiments of the second aspect, or modules configured to perform the communication method according to any one of the fourth aspect or the possible embodiments of the fourth aspect.

According to a seventh aspect, a terminal device is provided. The terminal device includes a transceiver, a processor, and a memory. The processor is configured to control the transceiver to receive or send a signal, the memory is configured to store a computer program, and the processor is configured to invoke a computer program from the memory and run the computer program, to enable the terminal device to perform the method according to any one of the first aspect or the possible embodiments of the first aspect, or the method according to any one of the third aspect or the possible embodiments of the third aspect.

According to an eighth aspect, a network device is provided. The network device includes a transceiver, a processor, and a memory. The processor is configured to control the transceiver to receive or send a signal, the memory is configured to store a computer program, and the processor is configured to invoke a computer program from the memory and run the computer program, to enable the network device to perform the method according to any one of the second aspect or the possible embodiments of the second aspect, or the method according to any one of the fourth aspect or the possible embodiments of the fourth aspect.

In a specific embodiment process, the processor may be configured to perform, for example without limitation to, baseband related processing, and a receiver and a transmitter may be configured to perform, for example without limitation to, radio frequency receiving and transmission. The foregoing components may be separately disposed on chips independent of each other, or at least some or all of the components may be disposed on a same chip. For example, the receiver and the transmitter may be disposed on a receiver chip and a transmitter chip that are independent of each other, or may be integrated into a transceiver and then disposed on a transceiver chip. For another example, the processor may be further classified into an analog baseband processor and a digital baseband processor. The analog baseband processor and the transceiver may be integrated into a same chip, and the digital baseband processor may be disposed on an independent chip. With continuous development of integrated circuit technologies, more components can be integrated into a same chip. For example, the digital baseband processor and a plurality of application processors (for example without limitation to, a graphics processor and a multimedia processor) may be integrated into a same chip. Such a chip may be referred to as a system on chip (System on Chip). Whether all the components are separately disposed on different chips or integrated and disposed on one or more chips usually depends on a specific requirement for a product design. A specific implementation of the components is not limited in the embodiments of this application.

According to a ninth aspect, a processor is provided. The processor includes an input circuit, an output circuit, and a processing circuit. The processing circuit is configured to: receive a signal by using the input circuit, and transmit a signal by using the output circuit, so that the processor performs the method according to any one of the first aspect to the fourth aspect or the possible embodiments of the first aspect to the fourth aspect.

In embodiments, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in the embodiments of this application.

According to a tenth aspect, a processing apparatus is provided. The processing apparatus includes a memory and a processor. The processor is configured to: read an instruction stored in the memory, receive a signal by using a receiver, and transmit a signal by using a transmitter, to perform the method according to any one of the first aspect to the fourth aspect or the possible embodiments of the first aspect to the fourth aspect.

Optionally, there are one or more processors and one or more memories.

Optionally, the memory may be integrated into the processor, or the memory and the processor are separately disposed.

In embodiments, the memory may be a non-transitory memory such as a read-only memory (ROM). The memory and the processor may be integrated on a same chip, or may be separately disposed on different chips. A type of the memory and a manner of disposing the memory and the processor are not limited in the embodiments of this application.

According to an eleventh aspect, a chip is provided. The chip includes a processor and a memory. The memory is configured to store a computer program. The processor is configured to invoke the computer program from the memory and run the computer program. The computer program is used to implement the method according to any one of the first aspect to the fourth aspect and the possible embodiments of the first aspect to the fourth aspect.

According to a twelfth aspect, a computer program product is provided. The computer program product includes a computer program (also referred to as code or an instruction). When the computer program is run, a computer is enabled to perform the method according to any one of the first aspect to the fourth aspect and the possible embodiments of the first aspect to the fourth aspect.

According to a thirteenth aspect, a computer-readable medium is provided. The computer-readable medium stores a computer program (also referred to as code or an instruction). When the computer program is run on a computer, the computer is enabled to perform the method according to any one of the first aspect to the fourth aspect and the possible embodiments of the first aspect to the fourth aspect.

In some possible embodiments, a first polarization direction is a horizontal polarization direction, and a second polarization direction is a vertical polarization direction.

In some possible embodiments, a CSI feedback-based transmission scheme (or a CSI measurement-based transmission scheme) includes diversity transmission schemes such as space-time diversity (space-time transmit diversity, STTD) (or referred to as space-time block coding (space time block coding, STBC)), space-frequency diversity (space-frequency transmit diversity, SFTD) (or referred to as space-frequency block coding (space frequency block coding, SFBC)), cyclic delay diversity (cyclic delay diversity, CDD) (for example, small delay-CDD (short delay-CDD, SD-CDD) or large delay-CDD (large delay-CDD, LD-CDD)), CDD-based spatial multiplexing, polarization direction-based precoder cycling, precoder cycling-based space-time diversity, precoder cycling-based space-frequency diversity, and precoder cycling-based CDD, and combinations of the foregoing various transmission schemes.

DESCRIPTION OF EMBODIMENTS

The following describes the technical solutions of this application with reference to the accompanying drawings.

It should be understood that the technical solutions in this application may be applied to various communications systems, for example, a global system for mobile communications (GSM) system, a code division multiple access (CDMA) system, a wideband code division multiple access (WCDMA) system, a general packet radio service (GPRS) system, a long term evolution (LTE) system, an advanced long term evolution (LTE-Advanced, LTE-A) system, a universal mobile telecommunications system (UMTS), a next-generation communications system (for example, a fifth-generation (5G) communications system), a convergent system of a plurality of access systems, or an evolved system. The 5G system may be also referred to as a new radio access technology (NR) system.

Figure 1:
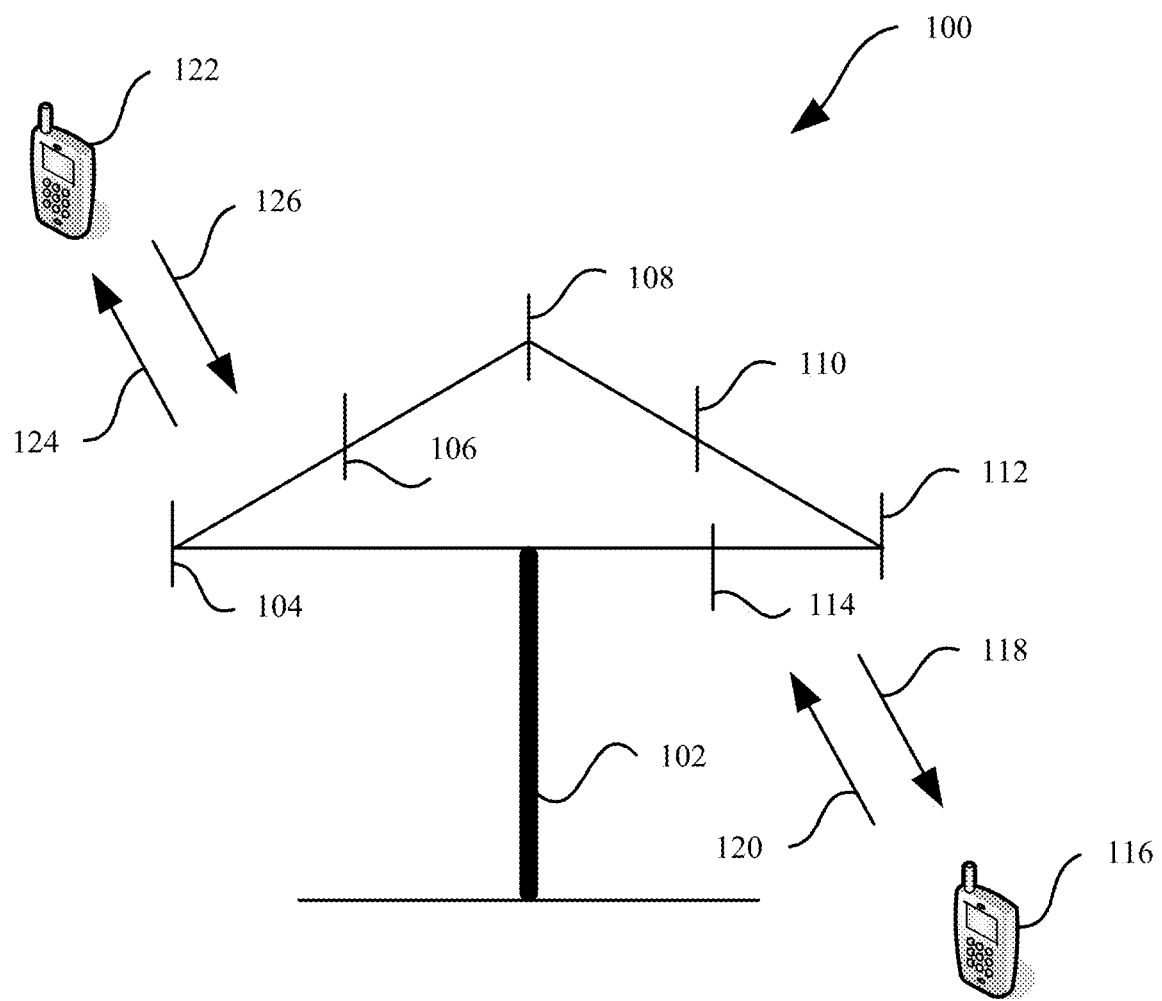
FIG. 1 is a schematic diagram of a communications system to which a communication method in an embodiment of this application is applicable.

For ease of understanding of the embodiments of this application, a communications system applicable to the embodiments of this application is described in detail with reference to FIG. 1. FIG. 1 is a schematic diagram of a communications system to which a communication method in an embodiment of this application is applicable. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

It should be understood that the network device may be any device having a wireless sending/receiving function or a chip that may be disposed on the device. The device includes but is not limited to a base station (for example, a NodeB, an evolved NodeB eNodeB, a network device in a fifth generation (5G) communications system (such as a transmission point (TP), a transmission reception point (TRP), a base station, or a small cell device), a network device in a future communications system, an access node in a wireless fidelity (WiFi) system, a wireless relay node, a wireless backhaul node, and the like.

The network device 102 may communicate with a plurality of terminal devices (such as a terminal device 116 and a terminal device 122). The network device 102 may communicate with any quantity of terminal devices similar to the terminal device 116 or 122.

It should be understood that the terminal device may also be referred to as user equipment (UE), an access terminal, a subscriber unit, a subscriber station, a mobile station, a mobile station, a remote station, a remote terminal, a mobile device, a user terminal, a terminal, a wireless communication device, a user agent, or a user apparatus. In the embodiments of this application, the terminal device may be a mobile phone, a tablet computer (e.g., a pad), a computer having a wireless receiving and sending function, a virtual reality (VR) terminal device, an augmented reality (AR) terminal device, a wireless terminal in industrial control, a wireless terminal in self driving, a wireless terminal in remote medical, or a wireless terminal in smart grid, a wireless terminal in transportation security, a wireless terminal in smart city, a wireless terminal in smart home, or the like. An application scenario is not limited in the embodiments of this application. In this application, the foregoing terminal device and a chip that can be disposed in the foregoing terminal device are collectively referred to as a terminal device.

As shown in FIG. 1, the terminal device 116 communicates with the antennas 112 and 114, where the antennas 112 and 114 send information to the terminal device 116 over a forward link 118, and receive information from the terminal device 116 over a reverse link 120. In addition, the terminal device 122 communicates with the antennas 104 and 106, where the antennas 104 and 106 send information to the terminal device 122 over a forward link 124, and receive information from the terminal device 122 over a reverse link 126.

The embodiments of this application may be applied to downlink data transmission, or may be applied to uplink data transmission, or may be applied to device-to-device (D2D) data transmission. For example, for downlink data transmission, a device at a transmit end is a base station, and a device at a corresponding receive end is UE. For uplink data transmission, a device at a transmit end is UE, and a device at a corresponding receive end is a base station. For D2D data transmission, a sending device is UE, and a corresponding receiving device is also UE. This is not limited in the embodiments of this application.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or each area that are/is designed for communication may be referred to as a sector of the network device 102. For example, the antenna group may be designed to communicate with a terminal device in the sector within a coverage area of the network device 102. In a process in which the network device 102 communicates with the terminal devices 116 and 122 respectively over the forward links 118 and 124, a transmit antenna of the network device 102 may improve signal-to-noise ratios of the forward links 118 and 124 through beamforming. In addition, compared with a manner in which the network device sends a signal to all terminal devices of the network device by using a single antenna, when the network device 102 sends, through beamforming, a signal to the terminal devices 116 and 122 that are randomly scattered within a related coverage area, a mobile device in a neighboring cell suffers less interference.

The network device 102, the terminal device 116, or the terminal device 122 may be a wireless communications sending apparatus and/or a wireless communications receiving apparatus. When sending data, the wireless communications sending apparatus may encode data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a public land mobile network (PLMN) network, a device-to-device (D2D) network, a machine-to-machine (M2M) network, or another network. FIG. 1 is merely a simplified schematic diagram of an example for ease of understanding, and the network may further include another network device that is not shown in FIG. 1.

Figure 2:
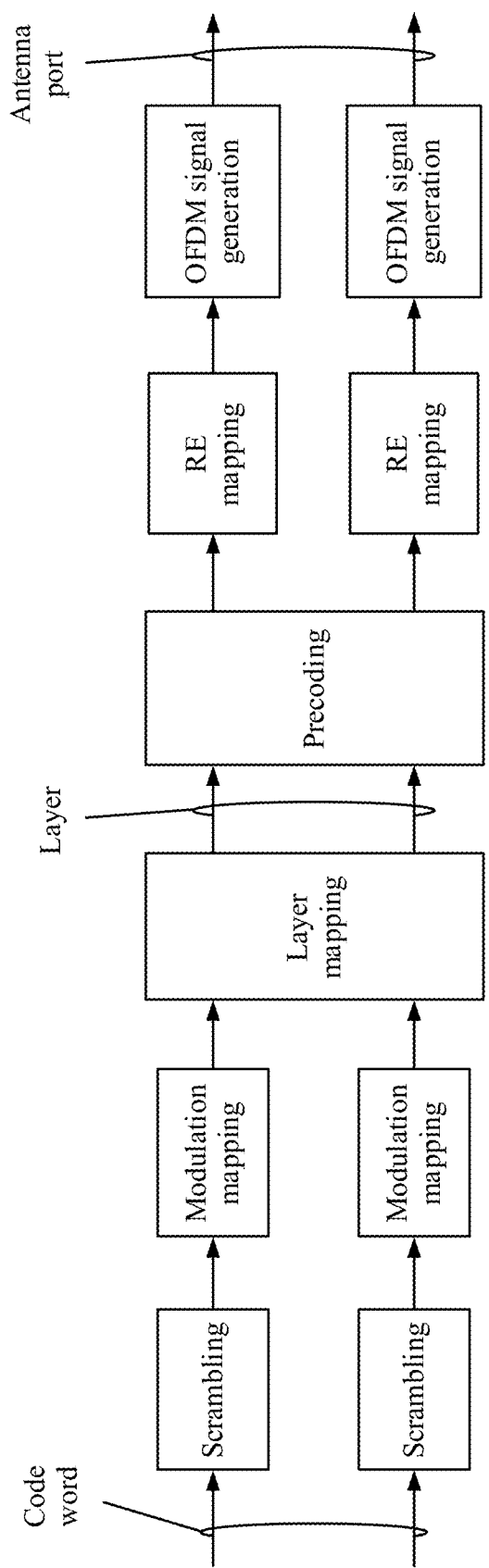
FIG. 2 is a schematic diagram of a downlink physical channel processing process used in an existing LTE system.

For ease of understanding the embodiments of this application, the following briefly describes a downlink physical channel processing process in an LTE system with reference to FIG. 2. FIG. 2 is a schematic diagram of a downlink physical channel processing process used in an existing LTE system. In the downlink physical channel processing process, a processed object is a code word, and the code word is usually a coded (including at least channel coding) bit stream. The code word is scrambled to generate a scrambled bit stream. The scrambled bit stream undergoes modulation mapping to obtain a modulation symbol stream. The modulated symbol stream is mapped to a plurality of layers through layer mapping. For ease of differentiation and description, in the embodiments of this application, a symbol stream obtained after layer mapping may be referred to as a layer mapping spatial layer (or referred to as a layer mapping spatial stream or a layer mapping symbol stream). Precoding is performed on the layer mapping spatial layer, to obtain a plurality of precoded data streams (or referred to as precoded symbol streams). The precoded symbol streams are mapped to a plurality of REs through resource element (RE) mapping. These REs are then modulated through orthogonal frequency division multiplexing (OFDM) to generate OFDM symbol streams. The OFDM symbol stream is then transmitted through an antenna port.

A precoding technology may be that a to-be-transmitted signal is preprocessed at a transmit end when a channel state is known, in other words, the to-be-transmitted signal is processed by using a precoding matrix that matches a channel resource, so that a precoded to-be-transmitted signal adapts to a channel, and complexity of eliminating inter-channel impact at a receive end is reduced. Thus, by precoding a transmitted signal, received signal quality (for example, a signal to interference plus noise ratio (signal to interference plus noise ratio, SINR)) is improved. Therefore, by using the precoding technology, a transmit end device and a plurality of receive end devices may perform transmission on a same time-frequency resource. In other words, multi-user multiple-input multiple-output (multiple user multiple input multiple output, MU-MIMO) is implemented. It should be noted that related description of the precoding technology is used as only an example, and is not used to limit the protection scope of the embodiments of this application. In an embodiment process, precoding may be performed in another manner (for example, when a channel matrix cannot be learned of, precoding is performed by using a preset precoding matrix or in a weighted processing manner). Specific content is not described in this specification.

To obtain a precoding matrix that can adapt to a channel, a transmit end usually perform channel estimation by sending a reference signal, to obtain channel state information (CSI) obtained by a receive end through channel measurement, so as to determine a relatively accurate precoding matrix to precode to-be-sent data.

With development of a multiple-antenna technology, because a quantity of antenna ports increases, a beamformed reference signal is proposed. The beamformed reference signal is a reference signal (a precoded reference signal for short) on which precoding processing is already performed, and may be similar to a class B reference signal in an LTE protocol. Correspondingly, a reference signal on which no precoding processing is performed may be similar to a class A reference signal in the LTE protocol.

It should be noted that the precoded reference signal may be used to: measure an equivalent channel, and select an antenna port based on the measurement of the equivalent channel. In the embodiments of this application, one antenna port may be corresponding to one precoding vector. When a transmit end transmits, based on a precoding vector corresponding to one antenna port, a precoded reference signal, the transmitted precoded reference signal is directional. Therefore, a precoded reference signal transmitted through an antenna port may be understood as a beam in a specific direction. Simply, one antenna port is corresponding to one beam.

It should be understood that a communication manner applicable to the reference signal and a type of the reference signal are not particularly limited in this application. For example, for downlink data transmission, the transmit end may be, for example, a network device, the receive end may be, for example, a terminal device, and the reference signal may be, for example, a channel state information-reference signal (CSI-RS). For uplink data transmission, the transmit end may be, for example, a terminal device, the receive end may be, for example, a network device, and the reference signal may be, for example, a sounding reference signal (SRS). For device-to-device (D2D) data transmission, the transmit end may be, for example, a terminal device, the receive end may be, for example, a terminal device, and the reference signal may be, for example, an SRS. It should be understood that the foregoing listed types of the reference signals are merely examples for description, and should not be construed as any limitation on this application. A possibility that another reference signal is used to implement a same function or a similar function is not excluded in this application.

It should be noted that, in the embodiments of this application, an antenna port (or a port for short) may be understood as a reference signal port, and one reference signal is corresponding to one antenna port. The reference signal described herein may include, for example, a channel state information-reference signal CSI-RS port or a DMRS port, or may include an SRS port or a DMRS port. Reference signals of different types are used to implement different functions. The antenna port is described in this application, and may be a CSI-RS port, a DMRS port, an SRS port, or a DMRS port. A person skilled in the art may understand a meaning of the antenna port.

To improve reliability of data transmission, currently, some transmission schemes are already known, and a diversity transmission method is used to obtain a diversity gain, to be adapted to a scenario in which a channel environment rapidly changes or another scenario in which accurate CSI cannot be obtained. In a possible embodiment, the transmit end may process signals (for example, including a DMRS and a data signal) by using precoding vectors corresponding to different polarization directions, to obtain a space diversity gain. This transmission scheme may be referred to as polarization direction-based diversity transmission. It should be understood that in the polarization direction-based diversity transmission scheme, different polarization directions of antenna ports are used, and data is precoded by using precoding vectors corresponding to the ports of the different polarization directions, to obtain gains in the different polarization directions, thereby helping obtain the space diversity gain.

In prior approaches, when transmitting data by using a diversity transmission scheme, a transmit end does not measure and obtain CSI based on the diversity transmission scheme. Actually, when performing channel measurement, a receive end usually performs channel measurement based on a closed-loop spatial multiplexing (CLSM) transmission scheme. CSI fed back by the receive end is also usually applicable to the CLSM transmission scheme, but cannot meet a requirement of diversity transmission. Therefore, this is adverse to maximize a diversity gain.

For ease of understanding of the embodiments of this application, downlink channel measurement is used as an example herein to simply describe a method used in prior systems, to be specific, a receive end (namely, a terminal device) feeds back a precoding vector to a transmit end (namely, a network device) based on a received precoded reference signal.

Figure 3:
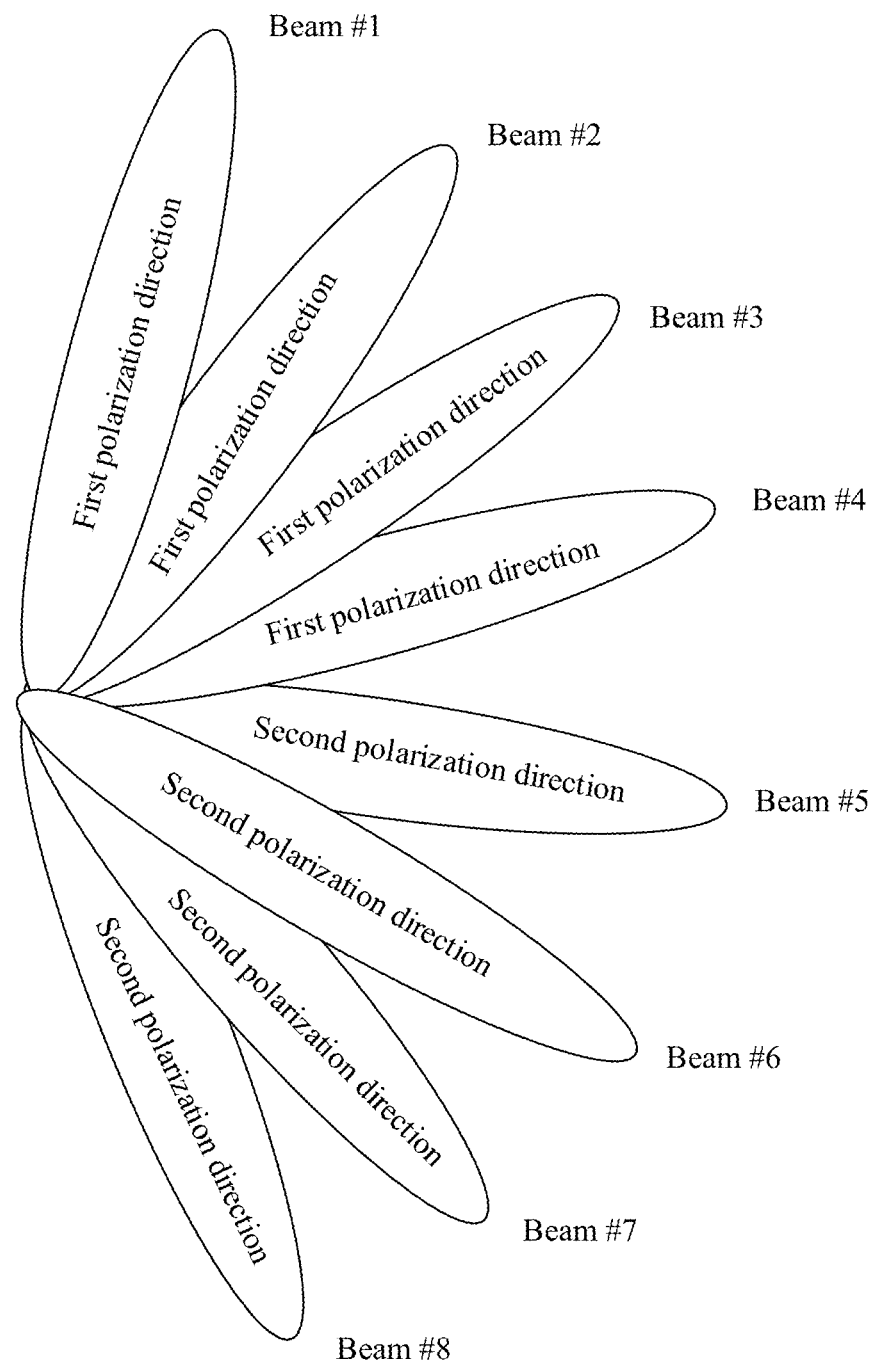
FIG. 3 is a schematic architectural diagram of a plurality of beams according to an embodiment of this application.

The precoded reference signal is first described with reference to the accompanying drawing. FIG. 3 shows a plurality of precoded reference signals. FIG. 3 shows eight precoded reference signals. The eight precoded reference signals may be corresponding to eight beams (namely, a beam #1 to a beam #8) shown in the figure, and the eight precoded reference signals may be transmitted through ports of two polarization directions (namely, a first polarization direction and a second polarization direction in the figure). Therefore, the eight beams are in a one-to-one correspondence with eight ports. For example, the beam #1 may be corresponding to a port #1, a beam #2 may be corresponding to a port #2, and so on. Examples are not enumerated one by one herein. A precoded reference signal sent through each port may be obtained after precoding is performed based on one precoding vector. Precoding vectors used by any two ports may be the same or different.

It should be understood that FIG. 3 shows the eight beams only for ease of understanding, and describes the one-to-one correspondence between the eight beams and the eight ports. However, this should not be construed as any limitation on this application. A quantity of beams and a quantity of ports are not limited in this application.

The terminal device performs channel measurement based on the foregoing eight received precoded reference signals, performs measurement based on channel quality obtained through measurement and a plurality of different measurement criteria, and indicates (feeds back), to the transmit end, a port corresponding to an optimal precoding vector in a measurement criterion. For example, the measurement criterion may include but is not limited to: signal to interference plus noise ratio (SINR) maximization, Shannon capacity maximization, or minimization of a mean square error (MSE) between a quantized equivalent channel matrix corresponding to a PMI and a measured equivalent channel matrix.

Specifically, the terminal device may notify, based on the channel quality obtained through measurement and by using a PMI, the network device of a port corresponding to an optimal equivalent channel in a measurement criterion. The PMI and a rank indication (RI) are used to uniquely indicate an element in a codebook. The element may be used to indicate at least two ports, and each port is corresponding to one precoding vector. In other words, each port indicates a precoding vector corresponding to one precoded reference signal. To be specific, a precoding vector corresponding to one port is a precoding vector used to generate a precoded reference signal corresponding to the port.

Because each element in the codebook may be used to indicate ports, in this application, each element in the codebook may be referred to as a port indication matrix.

For ease of understanding of the embodiments of this application, the following describes, with reference to a part of a codebook in an LTE protocol, a specific process of determining a precoding vector based on a PMI.

It should be noted that in the LTE protocol, a codebook corresponding to two polarization antennas is defined. The two polarization directions may be, for example, a horizontal polarization direction and a vertical polarization direction. Therefore, each element in the codebook in the LTE protocol shown below is corresponding to the two polarization directions. However, it should be understood that this should not be construed as any limitation on this application. This application does not exclude a possibility that more polarization directions are defined in a future protocol, or reference signals (or ports) are divided into more groups based on another factor (for example, an antenna panel). In this case, each element in the codebook may be corresponding to more different parameters. This is not limited in this application. For example, the reference signals are divided into four groups based on different antenna panels, and one column vector in each element may indicate ports corresponding to four antenna panels, in other words, indicate precoding vectors corresponding to the four antenna panels.

For ease of description and understanding, two groups of reference signals corresponding to the horizontal polarization direction and the vertical polarization direction and the corresponding codebook are used as an example to describe the embodiments of this application below.

Table 1 shows a part of the codebook of four antenna ports {15, 16, 17, and 18} in the LTE protocol. Specifically, the following table lists a codebook when the rank is 1 and a codebook when the rank is 2.

TABLE 1

| Codebook index n (namely, PMI) | Quantity of layers (namely, rank (RI)) | |
|---|---|---|
| | $\frac{1}{\sqrt{2}}\begin{bmatrix} e_0^{(2)} \\ e_0^{(2)} \end{bmatrix}$ | $\frac{1}{2}\begin{bmatrix} e_0^{(2)} & e_0^{(2)} \\ e_0^{(2)} & -e_0^{(2)} \end{bmatrix}$ |
| | $\frac{1}{\sqrt{2}}\begin{bmatrix} e_0^{(2)} \\ -e_0^{(2)} \end{bmatrix}$ | $\frac{1}{2}\begin{bmatrix} e_0^{(2)} & e_0^{(2)} \\ je_0^{(2)} & -je_0^{(2)} \end{bmatrix}$ |
| | $\frac{1}{\sqrt{2}}\begin{bmatrix} e_0^{(2)} \\ je_0^{(2)} \end{bmatrix}$ | $\frac{1}{2}\begin{bmatrix} e_1^{(2)} & e_1^{(2)} \\ e_1^{(2)} & -e_1^{(2)} \end{bmatrix}$ |
| | $\frac{1}{\sqrt{2}}\begin{bmatrix} e_0^{(2)} \\ -je_0^{(2)} \end{bmatrix}$ | $\frac{1}{2}\begin{bmatrix} e_1^{(2)} & e_1^{(2)} \\ je_1^{(2)} & -je_1^{(2)} \end{bmatrix}$ |
| | $\frac{1}{\sqrt{2}}\begin{bmatrix} e_1^{(2)} \\ e_1^{(2)} \end{bmatrix}$ | $\frac{1}{2}\begin{bmatrix} e_0^{(2)} & e_1^{(2)} \\ e_0^{(2)} & -e_1^{(2)} \end{bmatrix}$ |

TABLE 1-continued

| Codebook index n (namely, PMI) | Quantity of layers (namely, rank (RI)) | |
|---|---|---|
| | $\frac{1}{\sqrt{2}}\begin{bmatrix} e_1^{(2)} \\ -e_1^{(2)} \end{bmatrix}$ | $\frac{1}{2}\begin{bmatrix} e_0^{(2)} & e_1^{(2)} \\ je_0^{(2)} & -je_1^{(2)} \end{bmatrix}$ |
| | $\frac{1}{\sqrt{2}}\begin{bmatrix} e_1^{(2)} \\ je_1^{(2)} \end{bmatrix}$ | $\frac{1}{2}\begin{bmatrix} e_1^{(2)} & e_0^{(2)} \\ e_1^{(2)} & -e_0^{(2)} \end{bmatrix}$ |
| | $\frac{1}{\sqrt{2}}\begin{bmatrix} e_1^{(2)} \\ -je_1^{(2)} \end{bmatrix}$ | $\frac{1}{2}\begin{bmatrix} e_1^{(2)} & e_0^{(2)} \\ je_1^{(2)} & -je_0^{(2)} \end{bmatrix}$ |

It can be learned from the foregoing table that the PMI and the RI that are fed back by the terminal device may be used to jointly indicate a port indication matrix. Each port indication matrix may include at least one column vector, and each column vector is used to indicate two ports of different polarization directions (for example, the first polarization direction and the second polarization direction). When the RIs (or the ranks) are the same, a plurality of PMIs are in a one-to-one correspondence with a plurality of port indication matrices.

For example, when the ranks are 1 and 2 separately, port indication matrices whose codebook indexes corresponding to PMIs are 0 are respectively as follows:

If the rank is 1, $$\frac{1}{\sqrt{2}}\begin{bmatrix} e_0^{(2)} \\ e_0^{(2)} \end{bmatrix}.$$

If the rank is 2, $$\frac{1}{2}\begin{bmatrix} e_0^{(2)} & e_0^{(2)} \\ e_0^{(2)} & -e_0^{(2)} \end{bmatrix}.$$

In the port indication matrices listed above, (2) located above in a same column vector represents two ports {15 and 16} in the first polarization direction, and (2) located below represents two ports {17 and 18} in the second polarization direction.

If the rank is 1, the port indication matrix corresponding to the PMI includes one column vector, and the column vector indicates that selected ports is a $0^{th}$ port (namely, the port #15) in the first polarization direction and a $0^{th}$ port (namely, the port #17) in the second polarization direction. In this case, the PMI indicates a precoding vector (for example, denoted as $$\begin{bmatrix} P_1 \\ P_2 \end{bmatrix})$$

obtained after a precoding vector (for example, denoted as $P_1$) corresponding to the port #15 and a precoding vector (for example, denoted as $P_2$) corresponding to the port #17 are spliced. Alternatively, mathematical computation or mathematical transformation is performed on the precoding vector to obtain a precoding vector, which may be used for precoding processing in a data transmission process. The two polarization directions may be distinguished by using a co-phase (co-phase) of a polarized antenna array. In this application, the co-phase of the polarized antenna array may be represented by using α. With reference to the foregoing table, it may be learned that a value of α may be any value in [1, −1, j, and −j]. In the port indication matrix corresponding to the rank of 1 and the PMI of 0, the value of α is 1.

If the rank is 2, the port indication matrix corresponding to the PMI includes two column vectors that are respectively corresponding to two data layers. The first column vector indicates that selected ports are a $0^{th}$ port (namely, the port #15) in the first polarization direction and a $0^{th}$ port (namely, the port #17) in the second polarization direction, and the second column vector represents that selected ports are the $0^{th}$ port (namely, the port #15) in the first polarization direction and the $0^{th}$ port (namely, the port #17) in the second polarization direction. In this case, the PMI indicates a precoding matrix (for example, denoted as $$\begin{bmatrix} P_1 & P_1 \\ P_2 & -P_2 \end{bmatrix})$$

obtained by combining the precoding vector corresponding to the port #15 and the precoding vector corresponding to the port #17. Alternatively, mathematical computation or mathematical transformation is performed on the precoding vector, to obtain a precoding vectored, which may be used to precode the two data layers in a transmission process. Each data layer is corresponding to one precoding column vector. In the precoding matrix, different precoding column vectors may be obtained by using different co-phases of the polarized antenna array. To be specific, in the first precoding column vector, the value of is α 1; and in the second precoding column vector, the value of α is −1.

It may be learned that, in the prior approaches, a precoding vector fed back by the terminal device after performing channel measurement is obtained by splicing the first polarization direction and the second polarization direction by using the co-phase of the polarized antenna array. This may be understood as combining ports of two polarization directions into one virtual port. Precoding vectors of the two polarization directions are not independent of each other. If the precoding vectors are used to perform precoder cycling on data, this may be adverse to obtain a space diversity gain.

In polarization direction-based diversity transmission schemes such as STTD, SFTD, CDD, and polarization direction-based precoder cycling, the network device expects to obtain precoding matrices that are separately fed back in different polarization directions, to separately precode a plurality of to-be-transmitted data layers, so as to obtain a space diversity gain.

In addition, with reference to the foregoing table, it may be further learned that, when the RIs are the same, in the plurality of port indication matrices corresponding to the plurality of PMIs, different precoding matrices fed back by using any two PMIs may be obtained by using different co-phases of the polarized antenna array and/or different antenna ports. To be specific, in the codebook corresponding to the same RI, co-phases of the polarized antenna array of port indication matrices corresponding to any two PMIs are different; or antenna ports indicated by using port indication matrices corresponding to any two PMIs are different; or co-phases of the polarized antenna array of port indication matrices corresponding to any two PMIs are different, and antenna ports indicated by using the port indication matrices are also different.

For example, when the rank is 1, ports indicated in corresponding port indication matrices when PMIs are 0, 1, 2, and 3 are the same, and only co-phases of the polarized antenna array are different; and when PMIs are respectively 4, 5, 6, and 7, ports indicated in corresponding port indication matrices are the same, and only co-phases of the polarized antenna array are different. Co-phases of the polarized antenna array that are used when the PMIs are 0 and 4 are the same, but ports indicated in the port indication matrices are different. The rest may be deduced by analogy. For brevity, examples are not enumerated one by one herein.

In the prior approaches, when performing channel measurement, the terminal device may traverse a plurality of PMIs in a same rank after determining the rank, calculate a precoding matrix corresponding to each PMI according to a measurement criterion, and determine an optimal precoding matrix based on calculation results, to determine a PMI fed back to the network device.

However, if the terminal device can separately feed back precoding matrices in different polarization directions, precoding matrices determined based on the feedback may be considered as being independent of each other, in other words, a precoding matrix is fed back in each polarization direction. In this case, the co-phases of the polarized antenna array may be ignored, or the co-phases of the polarized antenna array are no longer needed to distinguish different polarization directions.

Therefore, this application provides a codebook restriction method, so that a receive end device can selectively perform channel measurement for a codebook in the prior art based on particularity of the diversity transmission schemes listed above.

It should be noted that the following embodiments shown with reference to codebooks are described by using only an example in which a codebook is corresponding to two polarization directions, but this should not be construed as any limitation on this application. The polarization direction is only a factor considered for distinguishing different ports. A transmit end device may alternatively group ports based on another different grouping mechanism such as different antenna panels, to send a plurality of groups of precoded reference signals. This application does not exclude that a new codebook is defined in an existing protocol or a future protocol, to correspond to more groups of ports and more groups of precoded reference signals.

Specifically, a candidate element set may be predefined in the codebook provided in this application. To distinguish elements included in the candidate element set from elements included in the codebook in the existing protocol, the elements included in the candidate element set may be referred to as candidate elements. Actually, the candidate element set may be understood as a subset of the existing codebook. Therefore, the candidate element set also has a structure of the existing codebook. Specifically, the candidate element set may include a plurality of candidate elements, each rank may be corresponding to at least one candidate element, and the at least one candidate element may be in a one-to-one correspondence with at least one PMI.

In the embodiments of this application, the candidate element set may be determined in the existing codebook according to the following rules.

Rule 1: When a quantity of candidate elements is at least 2, ports indicated by any two candidate elements are at least partially different.

To be specific, in the ports indicated by any two candidate elements, ports (for example, denoted as a port set #A) indicated by a candidate element A and ports (for example, denoted as a port set #B) indicated by a candidate element B may be completely different, in other words, an intersection set between the port set #A and the port set #B is an empty set. Alternatively, ports (namely, a port set #A) indicated by a candidate element A and ports (namely, a port set #B) indicated by a candidate element B may be partially the same and partially different, in other words, there is an intersection between the port set #A and the port set #B, but the intersection is only a subset of the port set #A and is also a subset of the port set #B.

Rule 2: When the rank is greater than 1, each candidate element may include a plurality of column vectors, and ports indicated by any two column vectors in a same candidate element are at least partially different.

To be specific, in the ports indicated by any two column vectors in the same candidate element, ports (for example, denoted as a port set #C) indicated by a column vector C and ports (for example, denoted as a port set #D) indicated by a column vector D may be completely different, in other words, an intersection set between the port set #C and the port set #D is an empty set. Alternatively, ports (namely, denoted as a port set #C) indicated by a column vector C and ports (namely, denoted as a port set #D) indicated by a column vector D may be partially the same and partially different, in other words, there is an intersection between the port set #C and the port set #D, but the intersection is only a subset of the port set #C and is also a subset of the port set #D.

For example, the codebook of the four antenna ports that is shown in Table 1 is restricted. If the co-phase $\alpha$ of the polarized antenna array in the codebook is excluded, in the codebook corresponding to the rank of 1, ports indicated by four elements indicated when PMIs=0 to 3 are the same, and the ports indicated by each element are a $0^{th}$ port in the first polarization direction and a $0^{th}$ port in the second polarization direction; ports indicated by four elements indicated when PMIs=4 to 7 are the same, and the ports indicated by each element are a $1^{st}$ port in the first polarization direction and a $1^{st}$ port in the second polarization direction. Because the ports indicated when PMIs=0 to 3 are different from the ports indicated when PMIs=4 to 7, a quantity of candidate elements may be restricted to 2 when the rank is 1

$$\left(\frac{1}{\sqrt{2}}\begin{bmatrix}e_0^{(2)}\\e_0^{(2)}\end{bmatrix} \text{ and } \frac{1}{\sqrt{2}}\begin{bmatrix}e_1^{(2)}\\e_1^{(2)}\end{bmatrix}\right).$$

Likewise, if the co-phase $\alpha$ of the polarized antenna array in the codebook is excluded, in the codebook corresponding to the rank of 2, when the PMI is any value of 0 to 4, ports indicated by two column vectors in an element indicated by the PMI are the same. For example, ports indicated by two column vectors in the element indicated when PMI=0 or 1 are the same, and the ports indicated by each column vector are a $0^{th}$ port in the first polarization direction and a $0^{th}$ port in the second polarization direction; and ports indicated by two column vectors in the element indicated when PMI=2 or 3 are the same, and the ports indicated by each column vector are a $1^{st}$ port in the first polarization direction and a $1^{st}$ port in the second polarization direction. Therefore, the four elements may be first excluded.

Ports indicated by two column vectors in an element indicated when the PMI is any value of 4 to 7 are different, ports indicated by one column vector in an element are a $0^{th}$ port in the first polarization direction and a $0^{th}$ port in the second polarization direction, and ports indicated by the other column vector in the same element are a $1^{st}$ port in the first polarization direction and a $1^{st}$ port in the second polarization direction. However, ports indicated by any two elements in the PMIs of 4 to 7 are the same, and the ports indicated by each element are the $0^{th}$ port and the $1^{st}$ port that are in the first polarization direction and the $0^{th}$ port and the $1^{st}$ port that are in the second polarization direction. Therefore, a quantity of candidate elements may be restricted to 1 when the rank is 2

$$\left( \frac{1}{2} \begin{bmatrix} e_0^{(2)} & e_1^{(2)} \\ e_0^{(2)} & -e_1^{(2)} \end{bmatrix} \right).$$

Further, an index may be redefined for the restricted candidate element, thereby reducing overheads caused by use of an existing index. For example, the existing codebook (see Table 1) of the four antenna ports needs to be indicated by using 3-bit PMIs. If the codebook is restricted to the foregoing listed candidate elements, only 1-bit PMIs may be required for indication. A specific correspondence between an index and the candidate element may be shown in Table 2.

TABLE 2

| Codebook index n' (namely, PMI) | Rank (namely, RI) is 1 | Codebook index n' (namely, PMI) | Rank (namely, RI) is 2 |
|---|---|---|---|
| | $\frac{1}{\sqrt{2}}\begin{bmatrix} e_0^{(2)} \\ e_0^{(2)} \end{bmatrix}$ | | $\frac{1}{2}\begin{bmatrix} e_0^{(2)} & e_1^{(2)} \\ e_0^{(2)} & -e_1^{(2)} \end{bmatrix}$ |
| | $\frac{1}{\sqrt{2}}\begin{bmatrix} e_1^{(2)} \\ e_1^{(2)} \end{bmatrix}$ | | |

When the receive end performs channel measurement, it may be pre-agreed that the receive end device and the transmit end device perform channel measurement based on a transmission scheme, and the foregoing listed restricted codebook is also proposed based on some special transmission schemes. Therefore, when determining a feedback-based transmission scheme (or referred to as a measurement-based transmission scheme), the receive end device may determine whether to use the restricted codebook to perform channel measurement.

It should be noted that the proposed method for redefining the index of the restricted candidate element may be referred to as bit compression. The method is not only applicable to a scenario in which feedback or an indication is performed based on the diversity transmission-based transmission scheme provided in this application, but also applicable to another scenario in which a codebook needs to be restricted. For example, in LTE, the network device may restrict a PMI of a rank or a rank based on a data throughput or a channel status, and indicate a restricted codebook subset to the terminal device by using, for example, a bitmap). When feeding back a PMI, the terminal device may redefine an index based on the candidate element set, to reduce overheads caused by the PMI.

For another example, in the LTE protocol, a codebook of two antenna ports {15 and 16} is shown in Table 3.

Each of the two antenna ports is corresponding to a polarization antenna. For example, the port #15 is corresponding to the first polarization direction, and the port #16 is corresponding to the second polarization direction. Therefore, a plurality of elements corresponding to a same rank may be distinguished by using co-phases $\{1, -1, j, \text{ and } -j\}$ of the polarized antenna array, to obtain different precoding matrices.

TABLE 3

| Codebook index n (namely, PMI) | Quantity of layers (namely, rank) | |
|---|---|---|
| | $\frac{1}{\sqrt{2}}\begin{bmatrix} 1 \\ 1 \end{bmatrix}$ | $\frac{1}{2}\begin{bmatrix} 1 & 1 \\ 1 & -1 \end{bmatrix}$ |
| | $\frac{1}{\sqrt{2}}\begin{bmatrix} 1 \\ -1 \end{bmatrix}$ | $\frac{1}{2}\begin{bmatrix} 1 & 1 \\ j & -j \end{bmatrix}$ |
| | $\frac{1}{\sqrt{2}}\begin{bmatrix} 1 \\ j \end{bmatrix}$ | |
| | $\frac{1}{\sqrt{2}}\begin{bmatrix} 1 \\ -j \end{bmatrix}$ | |

Based on the foregoing restriction on the candidate port indication matrix, if the co-phase of the polarized antenna array is excluded, at least one candidate element may be predefined, as shown in Table 4.

TABLE 4

| Codebook index n' (namely, PMI) | Quantity of layers (namely, rank) | |
|---|---|---|
| | $\frac{1}{\sqrt{2}}\begin{bmatrix} 1 \\ 1 \end{bmatrix}$ | $\frac{1}{2}\begin{bmatrix} 1 & 1 \\ 1 & -1 \end{bmatrix}$ |

It should be noted that the proposed method for redefining the index of the restricted candidate element may be referred to as bit compression. The method is not only applicable to a scenario in which feedback or an indication is performed based on the diversity transmission-based transmission scheme provided in this application, but also applicable to another scenario in which a codebook needs to be restricted.

For another example, Table 5 shows a part of a codebook of eight antenna ports {15, 16, 17, 18, 19, 20, 21, and 22} in the LTE protocol. Specifically, the following table lists a codebook when the rank is 1 and a codebook when the rank is 2.

TABLE 5

| Codebook index n (namely, PMI) | Quantity of layers (namely, rank) | | Codebook index n (namely, PMI) | Quantity of layers (namely, rank) | |
|---|---|---|---|---|---|
| | $\frac{1}{\sqrt{2}}\begin{bmatrix} e_0^{(4)} \\ e_0^{(4)} \end{bmatrix}$ | $\frac{1}{2}\begin{bmatrix} e_0^{(4)} & e_0^{(4)} \\ e_0^{(4)} & -e_0^{(4)} \end{bmatrix}$ | | $\frac{1}{\sqrt{2}}\begin{bmatrix} e_2^{(4)} \\ e_2^{(4)} \end{bmatrix}$ | $\frac{1}{2}\begin{bmatrix} e_0^{(4)} & e_1^{(4)} \\ e_0^{(4)} & -e_1^{(4)} \end{bmatrix}$ |
| | $\frac{1}{\sqrt{2}}\begin{bmatrix} e_0^{(4)} \\ -e_0^{(4)} \end{bmatrix}$ | $\frac{1}{2}\begin{bmatrix} e_0^{(4)} & e_0^{(4)} \\ je_0^{(4)} & -je_0^{(4)} \end{bmatrix}$ | | $\frac{1}{\sqrt{2}}\begin{bmatrix} e_2^{(4)} \\ -e_2^{(4)} \end{bmatrix}$ | $\frac{1}{2}\begin{bmatrix} e_0^{(4)} & e_1^{(4)} \\ je_0^{(4)} & -je_1^{(4)} \end{bmatrix}$ |
| | $\frac{1}{\sqrt{2}}\begin{bmatrix} e_0^{(4)} \\ je_0^{(4)} \end{bmatrix}$ | $\frac{1}{2}\begin{bmatrix} e_1^{(4)} & e_1^{(4)} \\ e_1^{(4)} & -e_1^{(4)} \end{bmatrix}$ | | $\frac{1}{\sqrt{2}}\begin{bmatrix} e_2^{(4)} \\ je_2^{(4)} \end{bmatrix}$ | $\frac{1}{2}\begin{bmatrix} e_1^{(4)} & e_2^{(4)} \\ e_1^{(4)} & -e_2^{(4)} \end{bmatrix}$ |
| | $\frac{1}{\sqrt{2}}\begin{bmatrix} e_0^{(4)} \\ -je_0^{(4)} \end{bmatrix}$ | $\frac{1}{2}\begin{bmatrix} e_1^{(4)} & e_1^{(4)} \\ je_1^{(4)} & -je_1^{(4)} \end{bmatrix}$ | | $\frac{1}{\sqrt{2}}\begin{bmatrix} e_2^{(4)} \\ -je_2^{(4)} \end{bmatrix}$ | $\frac{1}{2}\begin{bmatrix} e_1^{(4)} & e_2^{(4)} \\ je_1^{(4)} & -je_2^{(4)} \end{bmatrix}$ |
| | $\frac{1}{\sqrt{2}}\begin{bmatrix} e_1^{(4)} \\ e_1^{(4)} \end{bmatrix}$ | $\frac{1}{2}\begin{bmatrix} e_2^{(4)} & e_2^{(4)} \\ e_2^{(4)} & -e_2^{(4)} \end{bmatrix}$ | | $\frac{1}{\sqrt{2}}\begin{bmatrix} e_3^{(4)} \\ e_3^{(4)} \end{bmatrix}$ | $\frac{1}{2}\begin{bmatrix} e_0^{(4)} & e_3^{(4)} \\ e_0^{(4)} & -e_3^{(4)} \end{bmatrix}$ |
| | $\frac{1}{\sqrt{2}}\begin{bmatrix} e_1^{(4)} \\ -e_1^{(4)} \end{bmatrix}$ | $\frac{1}{2}\begin{bmatrix} e_2^{(4)} & e_2^{(4)} \\ je_2^{(4)} & -je_2^{(4)} \end{bmatrix}$ | | $\frac{1}{\sqrt{2}}\begin{bmatrix} e_3^{(4)} \\ -e_3^{(4)} \end{bmatrix}$ | $\frac{1}{2}\begin{bmatrix} e_0^{(4)} & e_3^{(4)} \\ je_0^{(4)} & -je_3^{(4)} \end{bmatrix}$ |
| | $\frac{1}{\sqrt{2}}\begin{bmatrix} e_1^{(4)} \\ je_1^{(4)} \end{bmatrix}$ | $\frac{1}{2}\begin{bmatrix} e_3^{(4)} & e_3^{(4)} \\ e_3^{(4)} & -e_3^{(4)} \end{bmatrix}$ | | $\frac{1}{\sqrt{2}}\begin{bmatrix} e_3^{(4)} \\ je_3^{(4)} \end{bmatrix}$ | $\frac{1}{2}\begin{bmatrix} e_1^{(4)} & e_3^{(4)} \\ e_1^{(4)} & -e_3^{(4)} \end{bmatrix}$ |
| | $\frac{1}{\sqrt{2}}\begin{bmatrix} e_1^{(4)} \\ -je_1^{(4)} \end{bmatrix}$ | $\frac{1}{2}\begin{bmatrix} e_3^{(4)} & e_3^{(4)} \\ je_3^{(4)} & -je_3^{(4)} \end{bmatrix}$ | | $\frac{1}{\sqrt{2}}\begin{bmatrix} e_3^{(4)} \\ -je_3^{(4)} \end{bmatrix}$ | $\frac{1}{2}\begin{bmatrix} e_1^{(4)} & e_3^{(4)} \\ je_1^{(4)} & -je_3^{(4)} \end{bmatrix}$ |

According to the foregoing rule for restricting the codebook, if the co-phase α of polarized antenna array in the codebook is excluded, in the codebook corresponding to the rank of 1, ports indicated by four elements indicated when PMIs=0 to 3 are the same, and the ports indicated by each element are a $0^{th}$ port in the first polarization direction and a $0^{th}$ port in the second polarization direction; ports indicated by four elements indicated when PMIs=4 to 7 are the same, and the ports indicated by each element are a $1^{st}$ port in the first polarization direction and a $1^{st}$ port in the second polarization direction; ports indicated by four elements indicated when PMIs=8 to 11 are the same, and the ports indicated by each element are a $2^{nd}$ port in the first polarization direction and a $2^{nd}$ port in the second polarization direction; ports indicated by four elements indicated when PMIs=12 to 15 are the same, and the ports indicated by each element are a $3^{rd}$ port in the first polarization direction and a $3^{rd}$ port in the second polarization direction. Because the ports indicated when PMIs=0 to 3, the ports indicated when PMI=s4 to 7, the ports indicated when PMIs=8 to 11, and the ports indicated when PMIs=12 to 15 are different, a quantity of candidate elements may be restricted to 4

$$\left( \frac{1}{\sqrt{2}}\begin{bmatrix} e_0^{(4)} \\ e_0^{(4)} \end{bmatrix}, \frac{1}{\sqrt{2}}\begin{bmatrix} e_1^{(4)} \\ e_1^{(4)} \end{bmatrix}, \frac{1}{\sqrt{2}}\begin{bmatrix} e_2^{(4)} \\ e_2^{(4)} \end{bmatrix}, \text{and } \frac{1}{\sqrt{2}}\begin{bmatrix} e_3^{(4)} \\ e_3^{(4)} \end{bmatrix} \right)$$

when the rank is 1.

Likewise, if the co-phase α of the polarized antenna array in the codebook is excluded, in the codebook corresponding to the rank of 2, when the PMI is any value of 0 to 7, ports indicated by two column vectors in a same element are the same. For example, ports indicated by two column vectors included in any one of two elements indicated when PMIs=0 and 1 are the same, and the ports indicated by each column vector are a $0^{th}$ port in the first polarization direction and a $0^{th}$ port in the second polarization direction; ports indicated by two elements indicated when PMIs=2 and 3 are the same, and the ports indicated by each element are a $1^{st}$ port in the first polarization direction and a $1^{st}$ port in the second polarization direction; ports indicated by two elements indicated when PMIs=4 and 5 are the same, and the ports indicated by each element are a $2^{nd}$ port in the first polarization direction and a $2^{nd}$ port in the second polarization direction; ports indicated by two elements indicated when PMIs=6 and 7 are the same, and the ports indicated by each element are a $3^{rd}$ port in the first polarization direction and a $3^{rd}$ port in the second polarization direction. Therefore, the eight elements may be first excluded.

Ports indicated by two column vectors in an element indicated when PMI is any value of 8 to 15 are different. For example, ports indicated by one column vector in an element indicated when PMI=8 or 9 are a $0^{th}$ port in the first polarization direction and a $0^{th}$ port in the second polarization direction, and ports indicated by the other column vector in the element are a $1^{st}$ port in the first polarization direction and a $1^{st}$ port in the second polarization direction; ports indicated by one column vector in an element indicated when PMI=10 or 11 are a $1^{st}$ port in the first polarization direction and a $1^{st}$ port in the second polarization direction, and ports indicated by the other column vector in the element are a $2^{nd}$ port of the first polarization direction and a $2^{nd}$ port in the second polarization direction; ports indicated by one column vector in an element indicated when PMI=12 or 13 are a $0^{th}$ port in the first polarization direction and a $0^{th}$ port in the second polarization direction, and ports indicated by the other column vector in the element are a $3^{rd}$ port in the first polarization direction and a $3^{rd}$ port in the second polarization direction; ports indicated by one column vector in an element indicated when PMI=14 or 15 are a $1^{st}$ port in the first polarization direction and a $1^{st}$ port in the second polarization direction, and ports indicated by the other column vector in the element are a $3^{rd}$ port in the first polarization direction and a $3^{rd}$ port in the second polarization direction. Ports indicated by every two consecutive PMIs in the ports indicated by the foregoing listed PMIs are the same, but the ports indicated when PMI=8 or 9, the ports indicated when PMI=10 or 11, the ports indicated when PMI=12 or 13, and the ports indicated when PMI=14 or 15 are at least partially different. Therefore, a quantity of candidate elements may be restricted to 4

$$\left( \frac{1}{2}\begin{bmatrix} e_0^{(4)} & e_1^{(4)} \\ e_0^{(4)} & -e_1^{(4)} \end{bmatrix}, \frac{1}{2}\begin{bmatrix} e_1^{(4)} & e_2^{(4)} \\ e_1^{(4)} & -e_2^{(4)} \end{bmatrix}, \frac{1}{2}\begin{bmatrix} e_0^{(4)} & e_3^{(4)} \\ e_0^{(4)} & -e_3^{(4)} \end{bmatrix}, \text{and } \frac{1}{2}\begin{bmatrix} e_1^{(4)} & e_3^{(4)} \\ e_1^{(4)} & -e_3^{(4)} \end{bmatrix} \right)$$

when the rank is 2.

Further, an index may be redefined for the restricted candidate element, thereby reducing overheads caused by use of an existing index. A specific correspondence between an index and the candidate element may be shown in Table 6.

TABLE 6

| Codebook index n' (namely, PMI) | Quantity of layers (namely, rank) | |
| --- | --- | --- |
| | $\frac{1}{\sqrt{2}}\begin{bmatrix} e_0^{(4)} \\ e_0^{(4)} \end{bmatrix}$ | $\frac{1}{2}\begin{bmatrix} e_0^{(4)} & e_1^{(4)} \\ e_0^{(4)} & -e_1^{(4)} \end{bmatrix}$ |
| | $\frac{1}{\sqrt{2}}\begin{bmatrix} e_1^{(4)} \\ e_1^{(4)} \end{bmatrix}$ | $\frac{1}{2}\begin{bmatrix} e_1^{(4)} & e_2^{(4)} \\ e_1^{(4)} & -e_2^{(4)} \end{bmatrix}$ |
| | $\frac{1}{\sqrt{2}}\begin{bmatrix} e_2^{(4)} \\ e_2^{(4)} \end{bmatrix}$ | $\frac{1}{2}\begin{bmatrix} e_0^{(4)} & e_3^{(4)} \\ e_0^{(4)} & -e_3^{(4)} \end{bmatrix}$ |
| | $\frac{1}{\sqrt{2}}\begin{bmatrix} e_3^{(4)} \\ e_3^{(4)} \end{bmatrix}$ | $\frac{1}{2}\begin{bmatrix} e_1^{(4)} & e_3^{(4)} \\ e_1^{(4)} & -e_3^{(4)} \end{bmatrix}$ |

It should be noted that the proposed method for redefining the index of the restricted candidate element may be referred to as bit compression. The method is not only applicable to a scenario in which feedback or an indication is performed based on the diversity transmission-based transmission scheme provided in this application, but also applicable to another scenario in which a codebook needs to be restricted.

The foregoing describes in detail the codebook restriction method provided in this application with reference to the codebook in the existing LTE protocol. When the receive end device performs channel measurement and feedback based on some diversity transmission schemes (for example, the foregoing illustrated polarization direction-based diversity transmission schemes such as STTD, SFTD, CDD, and polarization direction-based precoder cycling), may traverse precoding matrices corresponding to all candidate elements in the candidate element set to determine an optimal precoding matrix in a measurement criterion, and indicates (or feeds back) a corresponding PMI to the transmit end device.

It should be understood that the foregoing listed codebook is merely an example, and should not be construed as any limitation on this application. The foregoing restriction on the codebook is not limited to restriction on the codebook in the LTE protocol, and may also be applicable to restriction on another codebook in an existing protocol. In addition, the foregoing codebook restriction method is neither limited to being used in the foregoing listed two antenna ports, four antenna ports, and eight antenna ports, nor limited to being used in a scenario in which channel measurement is performed based on precoded reference signals.

It should be noted that the candidate element set obtained based on the foregoing codebook restriction method may be predefined (for example, defined in a protocol), and preconfigured in the transmit end device and the receive end device, or may be determined by the network device and then sent to the terminal device by using signaling. This is not limited in this application.

In addition, the foregoing candidate element set may be a newly generated codebook stored in the transmit end device and the receive end device. After determining a CSI measurement (or feedback)-based transmission scheme, the receive end device determines whether to use the codebook including the candidate element set to perform channel measurement. The transmit end device may determine a precoding vector based on CSI sent by the receive end device and the candidate element set.

Alternatively, the candidate element set may be embedded in an existing codebook (for example, the codebook in the LTE protocol), in other words, the codebook in the existing LTE protocol is still used, and the restricted candidate element set is a subset of all elements in the codebook. This method may be referred to as codebook subset restriction (codebook subset restriction). After determining a CSI measurement (or feedback)-based transmission scheme, the receive end device may determine the candidate element set according to the foregoing rule for restricting the codebook, and perform channel measurement based on the candidate element set. The transmit end device may also determine the candidate element set according to the foregoing rule for restricting the codebook, and determine a precoding vector based on the candidate element set and CSI sent by the receive end device. This case may be understood as a method for implicitly indicating the candidate element set by using the CSI measurement (or feedback)-based transmission scheme.

Alternatively, the candidate element set may be semi-statically indicated by the network device. For example, the terminal device is notified by using higher layer signaling (for example, an RRC message), so that the terminal device may perform channel measurement based on the candidate element set. The network device also determines a precoding vector based on the candidate element set and CSI fed back by the terminal device. This case may be understood as a method for explicitly indicating the candidate element set.

The following describes in detail a communication method provided in this application with reference to specific embodiments. In the communication method, a transmit end device and a receive end device may perform measurement based on some diversity transmission schemes (for example, the foregoing listed polarization direction-based diversity transmission schemes such as STTD, SFTD, CDD, and polarization direction-based precoder cycling), and perform channel measurement based on the foregoing listed restricted codebook (namely, the candidate element set).

It should be noted that the measurement-based transmission scheme or a feedback-based transmission scheme provided in this application is merely an assumption of a transmission scheme, and the transmission scheme is not actually used for data transmission. The receive end may perform channel measurement and CSI feedback (or indication) based on the assumed transmission scheme, to meet a requirement of the transmission scheme.

The communication method in the embodiments of this application is described in detail below with reference to the accompanying drawings.

It should be noted that, for ease of understanding and description, a polarization direction-based transmission scheme is used as an example to describe the communication method in the embodiments of this application in detail below. It should be understood that this should not be construed as any limitation on this application, and a transmission scheme used in this application is not limited to polarization direction-based diversity transmission.

It should be further noted that, in this embodiment of this application, an antenna port (or a port for short) may be understood as a reference signal port, and one reference signal is corresponding to one antenna port. The reference signal port described herein may include, for example, a channel state information-reference signal CSI-RS port and a DMRS port that are used for downlink data transmission, or may include an SRS port and a DMRS port that are used for uplink data transmission, or may include an SRS port and a DMRS port that are used for D2D data transmission. Reference signals of different types are used to implement different functions. Descriptions of the antenna port in this application may be a CSI-RS port, a DMRS port, an SRS port, or a DMRS port. A person skilled in the art may understand a meaning of the antenna port.

It should be further noted that in the embodiments of this application, the transmission scheme (or referred to as a transmission mode or a transmission mechanism) may be a transmission scheme defined in an existing protocol (for example, an LTE protocol), or may be a transmission scheme defined in a related protocol of future 5G. This is not particularly limited in the embodiments of this application. It should be understood that the transmission scheme may be understood as a name used to indicate a technical solution used for data transmission, and should not be construed as any limitation on the embodiments of this application. A possibility that the transmission scheme is replaced with another name in a future protocol is not excluded in the embodiments of this application.

Downlink channel measurement is used as an example to describe the communication method provided in this application in detail below with reference to the accompanying drawings.

It should be understood that the technical solutions in this application may be applied to a wireless communications system using a multiple-antenna technology. For example, the wireless communications system may be the communications system 100 shown in FIG. 1. The communications system may include at least one network device and at least one terminal device, and the network device and the terminal device may communicate with each other through a wireless air interface. For example, the network device in the communications system may be corresponding to the network device 102 shown in FIG. 1, and the terminal device may be corresponding to the terminal device 116 or 122 shown in FIG. 1.

It should be further understood that specific content of a precoded reference signal is not particularly limited in this application. In the embodiments of this application, the precoded reference signal is used to perform equivalent channel measurement. In downlink channel measurement, the precoded reference signal may be, for example, a precoded CSI-RS. In uplink channel measurement, the precoded reference signal may be, for example, a precoded SRS. It should be understood that the foregoing listed content are merely examples for description, and should not be construed as any limitation on this application. A possibility that another reference signal used to implement a same function or a similar function is defined in a future protocol is not excluded in this application.

Figure 4:
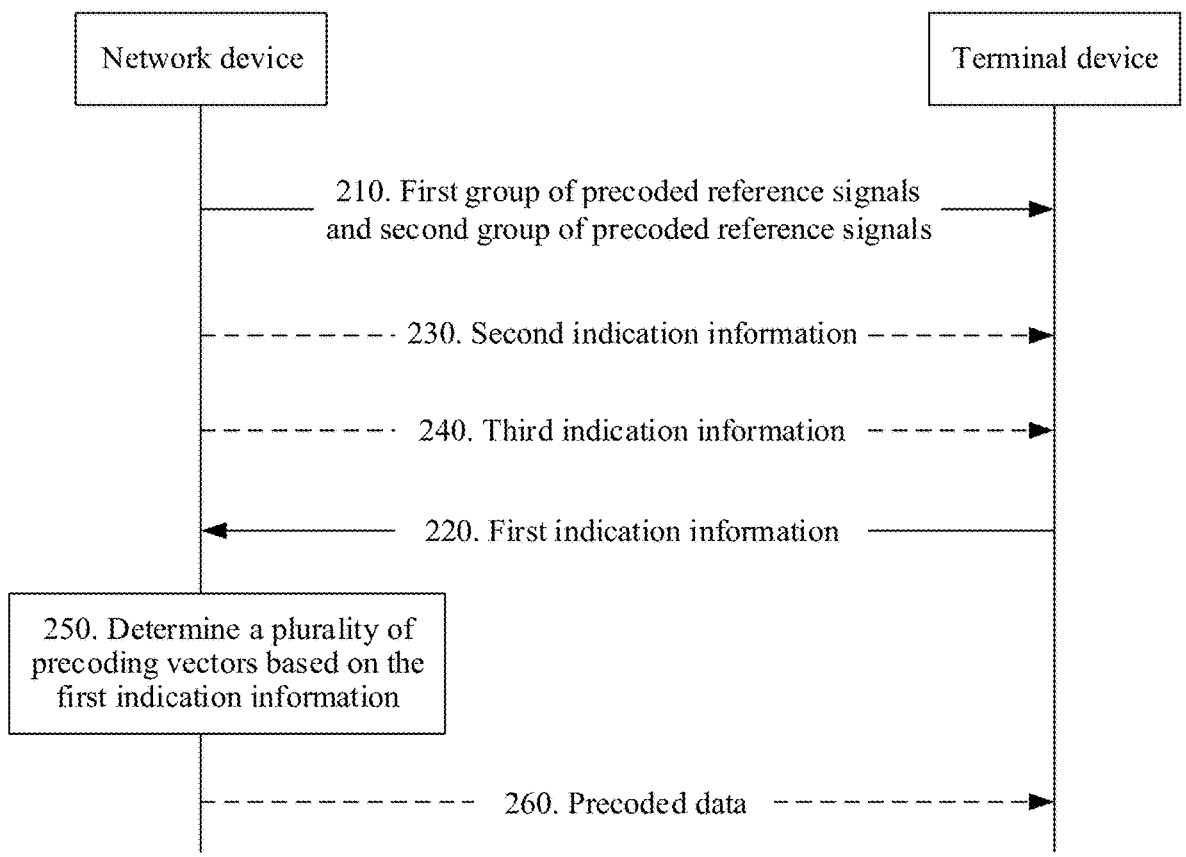
FIG. 4 is a schematic flowchart of a communication method according to an embodiment of this application.

FIG. 4 is a schematic flowchart of a communication method 200 according to an embodiment of this application from a perspective of device interaction. Specifically, FIG. 4 shows a downlink channel measurement process. As shown in FIG. 4, the communication method 200 may include step 210 to step 260.

In step 210, a network device sends a first group of precoded reference signals and a second group of precoded reference signals.

Specifically, the first group of precoded reference signals may include at least one precoded reference signal, and the second group of precoded reference signals may include at least one precoded reference signal. The two groups of precoded reference signals may be distinguished by using different polarization directions. Optionally, the first group of precoded reference signals is corresponding to a first polarization direction, and the second group of precoded reference signals is corresponding to a second polarization direction. In other words, a precoding vector used to precode a reference signal to obtain the first group of precoded reference signals is corresponding to the first polarization direction, and a precoding vector used to precode a reference signal to obtain the second group of precoded reference signals is corresponding to the second polarization direction. By way of example rather than limitation, the first polarization direction may be a horizontal polarization direction, and the second polarization direction may be a vertical polarization direction; or the first polarization direction may be a vertical polarization direction, and the second polarization direction may be a horizontal polarization direction.

Herein, a correspondence between the precoded reference signal and the polarization direction may be understood in this way: The precoded reference signals are in a one-to-one correspondence with antenna ports, one port may be defined for each precoded reference signal, each port may be a port formed after a precoding operation is performed by using one precoding vector in a polarization direction, and each antenna port is corresponding to one polarization direction. Therefore, the precoded reference signal is also in a correspondence with the polarization direction.

It may be understood that, in a same polarization direction, precoding vectors used by the network device to precode reference signals of a plurality of ports may also be different. If different precoding vectors are used to precode reference signals of a plurality of ports in different polarization directions, a plurality of precoded reference signals corresponding to the plurality of ports may point to different directions respectively.

Further referring to FIG. 3, based on the foregoing descriptions, precoded reference signals corresponding to the beams #1 to #4 in the figure may be grouped into one group, for example, may be corresponding to the first group of precoded reference signals, and precoded reference signals corresponding to the beams #5 to #8 are grouped into one group, for example, may be corresponding to the second group of precoded reference signals.

Correspondingly, in step 210, a terminal device receives the first group of precoded reference signals and the second group of precoded reference signals.

The first group of precoded reference signals and the second group of precoded reference signals are used for equivalent channel measurement performed by the terminal device.

It should be understood that this embodiment of this application is described by using only a polarization direction-based transmission scheme as an example, but this should not be construed as any limitation on this application. The polarization direction may be used as only a factor considered when the precoded reference signals are grouped, and the network device may alternatively send a plurality of groups of precoded reference signals based on another different grouping mechanism such as different antenna panels. In this case, the network device may send more groups of precoded reference signals based on a quantity of the antenna panels. Therefore, the first group of precoded reference signals and the second group of precoded reference signals may be understood as any two of the plurality of groups of precoded reference signals.

In step 220, the terminal device feeds back first indication information based on a CSI feedback-based transmission scheme.

Specifically, the terminal device may perform equivalent channel measurement based on a precoding vector corresponding to a port indicated by each element in a codebook, select, from a plurality of ports corresponding to the plurality of precoded reference signals and based on the CSI feedback-based transmission scheme and a measurement criterion (for example, a criterion such as SINR maximization, Shannon capacity maximization, or MSE minimization), a precoding vector corresponding to a port that is optimal in the measurement criterion, and feed back the precoding vector to the network device, so that the network device determines, based on the fed-back precoding vector, a precoding matrix used for data transmission.

It may be understood that for different terminal devices, determined precoding vectors used for data transmission may be different. This is related to factors such as a current location of the terminal device, a motion status of the terminal device, and an obstacle between the terminal device and the network device. This embodiment of this application is described in detail by using only one terminal device as an example, but this should not be construed as any limitation on this application. The terminal device may be any terminal device that is in a communication connection to the network device. This is not limited in this application.

Optionally, step 220 specifically includes:

The terminal device performs equivalent channel measurement based on the CSI feedback-based transmission scheme; and the terminal device feeds back the first indication information based on a result of the equivalent channel measurement.

Specifically, terminal device may determine a rank of an equivalent channel matrix based on the received first group of precoded reference signals and second group of precoded reference signals, then traverse, in a codebook corresponding to the rank, precoding matrices corresponding to all port indication matrices, perform calculation based on a measurement criterion to determine an optimal port indication matrix in the measurement criterion, and feed back indication information corresponding to the precoding matrix to the network device. In prior approaches, the CSI feedback-based transmission scheme is not considered for a codebook. In other words, a transmission scheme is not distinguished in calculation performed by the terminal device based on the codebook during channel measurement. Regardless of a transmission scheme that may be used by the network device for data transmission, the terminal device performs processing based on a same codebook.

However, after learning of the CSI feedback-based transmission scheme, the terminal device may perform targeted channel measurement and feedback based on a feature of the transmission scheme. For example, when performing channel measurement based on some transmission schemes (for example, space-frequency diversity, space-time diversity, and polarization direction-based precoder cycling), the terminal device may independently use equivalent channel matrices (or precoding matrices) corresponding to a same polarization direction, to obtain feedback of precoding matrices corresponding to different polarization directions.

It should be noted that the CSI feedback-based transmission scheme is a transmission scheme based on which the terminal device is instructed to perform measurement and feedback, and may be understood as a feedback type. The CSI feedback-based transmission scheme and a transmission scheme used for data transmission may be a same transmission scheme, or may be different transmission schemes. For example, the network device may determine, based on CSI fed back by the terminal device, whether to use the transmission scheme to perform data transmission.

In other words, the CSI feedback-based transmission scheme may be understood as an assumption of the transmission scheme. The terminal device performs CSI measurement and feedback based on the assumed transmission scheme, but this does not mean that the network device performs data transmission based on the transmission scheme.

In the embodiments of this application, the CSI feedback-based transmission scheme may be an assumed transmission scheme used for data transmission, and the transmission scheme may be a polarization direction-based diversity transmission scheme. In the polarization direction-based diversity transmission scheme, precoding vectors corresponding to different polarization directions may be used to process a signal to obtain a space diversity gain. By way of example rather than limitation, the transmission scheme includes a diversity transmission scheme such as STTD (or referred to as STBC), SFTD (or referred to as SFBC), CDD (for example, including SD-CDD and LD-CDD), CDD-based spatial multiplexing, polarization direction-based precoder cycling, precoder cycling-based space-time diversity, precoder cycling-based space-frequency diversity, and precoder cycling-based CDD, and a combination of the foregoing transmission schemes.

The polarization direction-based precoder cycling may be understood as that a plurality of precoding matrices used for precoder cycling are corresponding to different polarization directions. Because data is precoded based on the different polarization directions, a space diversity gain may be obtained.

Optionally, precoder cycling parameters include a precoder cycling granularity and a quantity of precoding matrices.

The precoder cycling granularity may be understood as a size of a resource on which a same precoding vector (or precoding matrix) is continuously used for precoding. The precoder cycling granularity may be, for example, one or more resource elements (RE), one or more resource units, one or more subbands (subband), or one or more bandwidth parts (BWP).

The quantity of precoding matrices represents a quantity of precoding matrices used for precoder cycling. For one data layer or one reference signal port, the quantity of precoding matrices may be a quantity of precoding vectors. In a precoder cycling transmission scheme and a transmission scheme combined with precoder cycling, a quantity of precoding matrices is usually an integer greater than 1.

It should be noted that the resource unit may be understood as a minimum scheduling unit for physical layer transmission. For example, the resource unit may be a resource block (RB) defined in an LTE protocol, or may be an RB group (RBG) including a plurality of RBs, or may be a part of an RB, for example, a ½ RB or a ¼ RB. A specific definition of the resource unit is not particularly limited in this application. If the resource unit is an RB, the precoder cycling granularity may also be referred to as a precoding resource block group size (PRG size) or a cycling PRG size.

It should be further noted that in some communications systems (for example, NR), because different terminal devices in a same cell may have different transmitting or receiving capabilities, a system may configure a corresponding bandwidth for each terminal device. The bandwidth configured for the terminal device may be referred to as a BWP, and the terminal device transmits data on the BWP of the terminal device. To support different services, different BWPs may support different transmission bandwidths (in other words, quantities of resource units (for example, RBs) included in the BWPs are different), subcarrier spacings, cyclic prefix (CP) lengths, and the like. In other words, different resource numerologies may be defined for resources of the different BWPs, and resources in a same BWP may be some contiguous frequency bands having a same resource numerology. Correspondingly, for a subband, refer to a definition in an existing protocol (for example, the LTE protocol). A wideband may include a plurality of subbands, and resource numerologies of resources of the plurality of subbands in the wideband may be the same. In addition, a subband may alternatively be defined in one BWP. To be specific, one BWP may include a plurality of subbands, and resource numerologies of resources of the plurality of subbands in the BWP may be the same. This is not particularly limited in this application.

In this embodiment of this application, the CSI feedback-based transmission scheme may be predefined by the network device and the terminal device, for example, defined in a protocol. Therefore, the terminal device may know the CSI feedback-based transmission scheme in advance. The CSI feedback-based transmission scheme may alternatively be predetermined by the network device and notified to the terminal device by using signaling.

Optionally, before step 220, the method 200 further includes step 230: The terminal device receives second indication information, where the second indication information indicates the CSI feedback-based transmission scheme.

Correspondingly, in step 230, the network device sends the second indication information, where the second indication information indicates the CSI feedback-based transmission scheme.

Specifically, in step 230, the terminal device may receive the second indication information, determine a candidate element set based on the CSI feedback-based transmission scheme indicated by the network device and according to the foregoing rule, and perform channel measurement based on the candidate element set, to determine the first indication information and feed back the first indication information to the network device.

Therefore, indication of the CSI feedback-based transmission scheme may be understood as implicit indication of a restricted codebook.

Optionally, before step 220, the method 200 further includes step 240: The terminal device receives third indication information, where the third indication information indicates at least one candidate element.

Correspondingly, in step 240, the network device sends the third indication information, where the third indication information indicates the at least one candidate element.

Specifically, the network device may send an index of each candidate element in the candidate element set (for example, a PMI of each element determined as the candidate element in an existing codebook) to the terminal device. The index may be carried in the third indication information. In step 240, the terminal device may receive the third indication information, determine the candidate element set based on the index carried in the third indication information, and perform channel measurement based on the candidate element set. In addition, after determining the candidate element set, the terminal device may deduce the feedback-based transmission scheme. Therefore, the terminal device may perform channel measurement based on the feedback-based transmission scheme and the candidate element set, to determine the first indication information and feed back the first indication information to the network device.

Therefore, indication of the restricted codebook may be understood as implicit indication of the CSI feedback-based transmission scheme.

In other words, the second indication information may be used to implicitly indicate the third indication information, and the third indication information may also be used to implicitly indicate the second indication information. Alternatively, the network device may send either the second indication information or the third indication information to the terminal device.

After performing equivalent channel measurement based on the CSI feedback-based transmission scheme, the terminal device may feed back at least one piece of first indication information to the network device.

Correspondingly, in step 220, the network device receives the first indication information fed back by the terminal device.

In this embodiment of this application, the first indication information may be an index of an element in the codebook, and the index may be used to indicate a first element in a codebook corresponding to a determined rank. In this embodiment, the codebook may be the restricted codebook (for example, the codebook shown in Table 2, Table 4, or Table 6) described above, and the first element may be one of candidate elements in the codebook, and is used to indicate a selected port, in other words, indicate a selected precoding vector.

Optionally, the first indication information is a PMI, and a one-to-one correspondence between at least one PMI and at least one candidate element is stored in a codebook corresponding to a same rank. When the rank is specified, each PMI may be used to indicate one candidate element, each candidate element may be used to determine at least two ports, and each port is corresponding to one precoding vector. In other words, each PMI may be used to determine at least two precoding vectors.

In other words, one RI and one PMI may be used to jointly indicate one candidate element, and the candidate element may be used to determine a plurality of precoding vectors.

The codebook may be predefined (for example, defined in a protocol), and preconfigured and stored in the terminal device and the network device; or may be predefined by the network device, and notified to the terminal device by using signaling.

In this embodiment of this application, the terminal device may feed back, to the network device in a joint feedback manner, indication information used to determine the precoding vectors.

Specifically, the terminal device may feed back one PMI to the network device, and the PMI may be used to determine a plurality of precoding vectors. In this embodiment of this application, for ease of differentiation and description, the PMI fed back by the terminal device to the network device is denoted as a first PMI, and a candidate element indicated by the first PMI is denoted as a first element.

It should be further understood that the PMI may be understood as an example of the first indication information, and this should not be construed as any limitation on this application. This application does not exclude a possibility that other indication information is defined in a future protocol to implement a function the same as or similar to that of the PMI.

In step 250, the network device determines a plurality of precoding vectors based on the first indication information.

The network device may determine the selected port based on the first element that is in the codebook and indicated by the first indication information in the codebook, in other words, may determine the selected precoding vectors.

Specifically, the first element may include at least one column vector, and each column vector may be used to indicate at least two precoding vectors corresponding to different polarization directions. The network device may determine the plurality of precoding vectors based on each column vector in the first element. At least one of the plurality of precoding vectors is corresponding to at least one of the first group of precoded reference signals, and at least one of the plurality of precoding vectors is corresponding to at least one of the second group of precoded reference signals.

In other words, the plurality of precoding vectors determined based on the first element may include at least two groups of precoding vectors, and each group of precoding vectors includes at least one precoding vector. A first group of precoding vectors in the at least two groups of precoding vectors is determined by using a precoding vector of at least one of the first group of precoded reference signals, and a second group of precoding vectors in the at least two groups of precoding vectors is determined by using a precoding vector of at least one of the second group of precoded reference signals.

Optionally, the method 200 further includes step 260: The network device precodes to-be-sent data based on the plurality of precoding vectors, and sends precoded data.

Specifically, the network device may determine, based on the plurality of precoding vectors determined and obtained in step 250, at least two precoding matrices used for data transmission. For example, the network device may directly combine the plurality of precoding vectors, to obtain the at least two precoding matrices used for data transmission; or the network device may perform mathematical transformation or mathematical computation on a precoding matrix obtained by combining the plurality of precoding vectors, to obtain the at least two precoding matrices used for data transmission. This is not limited in this application.

Assuming that the terminal device receives the first group of precoded reference signals corresponding to the first polarization direction and the second group of precoded reference signals corresponding to the second polarization direction, and performs channel measurement and feedback based on the first group of precoded reference signals and the second group of precoded reference signals, in step 250, the network device may determine a first precoding matrix corresponding to the first polarization direction and a second precoding matrix corresponding to the second polarization direction. In other words, any precoding vector in the first precoding matrix is corresponding to the first polarization direction, and any precoding vector in the second precoding matrix is corresponding to the second polarization direction.

It should be understood that, for a specific process in which the network device determines, based on the plurality of precoding vectors fed back by the terminal device, the precoding matrix used for data transmission, refer to prior approaches. For brevity, detailed descriptions of the specific process are omitted herein.

In this embodiment of this application, a specific process in which the network device performs precoder cycling on data by using the at least two precoding matrices determined based on the plurality of precoding vectors may be decomposed into: the to-be-sent data is precoded by using corresponding precoding matrices on different resources, where precoding matrices used in a same precoder cycling granularity may be the same. It should be understood that a specific process in which the to-be-sent data is precoded by using a precoding matrix on a resource corresponding to one precoder cycling granularity is similar to a specific process in which data is precoded by using one precoding matrix in prior approaches. For brevity, detailed descriptions of the specific process are omitted herein.

With reference to several different transmission schemes, the following describes in detail a process of feeding back the first indication information based on the CSI feedback-based transmission scheme and determining the plurality of precoding vectors based on the first indication information.

In the following illustrated embodiment, it is assumed that a channel matrix corresponding to the first group of precoded reference signals is $H_1$ and is corresponding to the first polarization direction, and a channel matrix corresponding to the second group of precoded reference signals is $H_2$ and is corresponding to the second polarization direction. A precoding vector corresponding to a $j^{th}$ port in an $i^{th}$ polarization direction is $P_{i,j}$, where a value of i is 1 or 2, a value of j is a natural number in [1, J], and J represents a quantity of ports in the $i^{th}$ polarization direction. In this case, an equivalent channel vector corresponding to the $j^{th}$ port in the $i^{th}$ polarization direction is $h_{i,j}=H_iP_{i,j}$. The terminal device measures an equivalent channel vector $h_{i,j}$ corresponding to each port.

The terminal device may obtain, by measuring channel quality, two ports of different polarization directions in a determined rank (for ease of description, for example, the ports may be denoted as an $m^{th}$ port in the first polarization direction and an $n^{th}$ port in the second polarization direction). By using precoding vectors corresponding to the two ports, channel quality calculated on a subcarrier can be optimal. m and n may be the same or different. This is not limited in this application.

Transmission Scheme 1: Space-Frequency Diversity or Space-Time Diversity

In the transmission scheme 1, after performing a transmit diversity operation on data of one data layer, the network device obtains data of two data layers. The two data layers are corresponding to two ports, and two independent precoding vectors are required to respectively precode the data of the two data layers.

If performing channel measurement based on a space-frequency diversity transmission scheme or a space-time diversity transmission scheme, the terminal device may traverse a precoding vector $P_{i,j}$ corresponding to each PMI (an example of the first indication information) in a codebook corresponding to a determined rank (it may be understood that, each PMI is used to indicate one port indication matrix, each port indication matrix indicates a precoding vector of at least one port in the first polarization direction and a precoding vector of at least one port in the second polarization direction, and in the transmission scheme 1, each port indication matrix indicates a precoding vector in the first polarization direction and a precoding vector in the second polarization direction), and determine, through calculation, an equivalent channel vector corresponding an optimal precoding vector on each data layer, $h_{1,m}$ and $h_{2,n}$ in a measurement criterion, where $h_{1,m} = H_1 P_{1,m}$, and $h_{2,n} = H_2 P_{2,n}$. In other words, the two precoding vectors determined by the terminal device through equivalent channel measurement and fed back by using the PMI are $P_{1,m}$ and $P_{2,n}$.

Therefore, an equivalent channel matrix applicable to the transmission scheme 1 may be represented as:

$$h_{\textit{eff}} = \begin{bmatrix} h_{1,m} & h_{2,n} \\ h_{2,n}^* & -h_{1,m}^* \end{bmatrix},$$

where $h_{1,m}$ represents an equivalent channel vector of an $m^{th}$ port on a $1^{st}$ subcarrier (corresponding to the space-frequency diversity) or a $1^{st}$ time unit (for example, an OFDM symbol (a symbol for short below) (corresponding to the space-time diversity), $h_{2,n}$ represents an equivalent channel vector of an $n^{th}$ port on the $1^{st}$ subcarrier or the $1^{st}$ time unit, $-h_{1,m}^*$ represents an equivalent channel vector of an $m^{th}$ port on a $2^{nd}$ subcarrier or a $2^{nd}$ time unit, $h_{2,n}^*$ represents an equivalent channel vector of an $n^{th}$ port on the $2^{nd}$ subcarrier or the $2^{nd}$ time unit, and $h^*$ represents a conjugation of h.

Herein, $h_{1,m}$ and $h_{2,n}$ in the first row represent an equivalent channel matrix measured on the $1^{st}$ subcarrier or the $1^{st}$ time unit, and $h_{1,m}$ and $h_{2,n}$ in the second row represent an equivalent channel matrix measured on the $2^{nd}$ subcarrier or the $2^{nd}$ time unit. The equivalent channel vector on the $1^{st}$ subcarrier and the equivalent channel vector on the $2^{nd}$ subcarrier may be slightly different, and the equivalent channel vector on the $1^{st}$ time unit and the equivalent channel vector on the $2^{nd}$ time unit may be slightly different. However, this application is merely for ease of understanding and description, and an example of the equivalent channel matrix is provided, but shall not be construed as any limitation on this application.

It should be noted that the precoding vectors used in the transmission scheme 1 may be the same on a same data layer, different subcarriers, or different time units. Therefore, the terminal device may determine only two precoding vectors, and may feed back the two precoding vectors to the network device by using either of the following manner 1 and manner 2. Alternatively, the network device may determine the two precoding vectors based on different feedback mechanisms and received PMIs.

The terminal device may feed back a PMI to the network device by using a joint feedback method. The PMI indicates a port indication matrix. The port indication matrix includes one column vector (It may be understood that, in the transmission scheme 1, only two precoding column vectors respectively corresponding to the first polarization direction and the second polarization direction need to be fed back. Therefore, the port indication matrix that needs to be fed back includes one column vector). The column vector may be used to indicate two precoding column vectors, one of the two precoding column vectors is corresponding to the first polarization direction, and the other one of the two precoding column vectors is corresponding to the second polarization direction. The two precoding column vectors are used to perform precoding respectively on the two data layers.

According to the foregoing descriptions, the PMI fed back by the terminal device may be used to indicate the port indication matrix as follows:

$$\frac{1}{\sqrt{2}} \begin{bmatrix} e_m^{(2)} \\ \alpha e_n^{(2)} \end{bmatrix},$$

where $\alpha$ is a co-phase of a polarized antenna array, and may be used to distinguish different precoding matrices in the LTE protocol. For example, in the codebook of the four antenna ports shown in Table 1 above, in the codebook corresponding to a same rank, for a same port, $\alpha$ may have a value of 1, −1, j, or −j, and different precoding matrices may be determined and obtained.

The network device may determine the column vector in the codebook based on the received PMI. It is assumed that precoding vectors used by a port corresponding to the column vector are:

$$\begin{bmatrix} P_{1,m} \\ \alpha P_{2,n} \end{bmatrix},$$

where $P_{1,m}$ represents a precoding vector corresponding to an $m^{th}$ port in the first polarization direction, and $P_{2,n}$ represents a precoding vector corresponding to an $n^{th}$ port in the second polarization direction. It should be noted that, a value of the co-phase of the polarized antenna array in the matrix indicated by the PMI is usually the same as a value in precoding matrix indicated by the matrix. For example, the value may be 1, −1, j, or −1. However, this is not limited in this application.

The network device may determine the two precoding vectors based on the transmission scheme 1 and the column vector. Specifically, the network device may split a precoding vector indicated by the column vector into two precoding vectors, which are as follows:

$$\begin{bmatrix} P_{1,m} \\ 0 \end{bmatrix} \text{ and } \begin{bmatrix} 0 \\ P_{2,n} \end{bmatrix}; \text{ or } \begin{bmatrix} P_{1,m} \\ 0 \end{bmatrix} \text{ and } \begin{bmatrix} 0 \\ \alpha P_{2,n} \end{bmatrix},$$

where $$\begin{bmatrix} P_{1,m} \\ 0 \end{bmatrix}$$

is a precoding vector that has a specific value in the first polarization direction and has a value of 0 in the second polarization direction, and $$\begin{bmatrix} 0 \\ P_{2,n} \end{bmatrix} \text{ or } \begin{bmatrix} 0 \\ \alpha P_{2,n} \end{bmatrix}$$

is a precoding vector that has a specific value in the second polarization direction and has a value of 0 in the first polarization direction. In other words, for each of the two precoding vectors, a value of the precoding vector in one polarization direction is 0, and only the other polarization direction is considered. The two precoding vectors are independent of each other. In other words, the two polarization directions corresponding to the two precoding vectors are independent of each other.

Therefore, the network device may determine, based on the PMI fed back by the terminal device, the two precoding vectors used for the transmission scheme 1. It can be learned that, after the foregoing precoding vector is split into the precoding vectors respectively corresponding to the two polarization directions, whether the co-phase $\alpha$ of the polarized antenna array needs to be added may be determined by the network device. However, regardless of whether the co-phase $\alpha$ of the polarized antenna array is added, the two precoding vectors are independent of each other. In other words, in a process of performing channel measurement and feedback based on the transmission scheme 1, for any two or more port indication matrices indicating a same port in the codebook, the co-phase of the polarized antenna array may no longer be used to distinguish different precoding matrices. In other words, any two or more port indication matrices indicating the same port in the codebook may be used to determine a same precoding matrix, and whether there is the co-phase of the polarized antenna array has no impact on the precoding matrix.

For example, in Table 1, when the RI is 1 and the PMI is 0, 1, 2, or 3, it may be determined that the selected ports are the 0$^{th}$ port (namely, the port #15) in the first polarization direction and the 0$^{th}$ port (namely, the port #17) in the second polarization direction, and it may be determined that the two precoding vectors are:

$$\begin{bmatrix} P_{1,0} \\ 0 \end{bmatrix} \text{ and } \begin{bmatrix} 0 \\ P_{2,0} \end{bmatrix}; \text{ or } \begin{bmatrix} P_{1,0} \\ 0 \end{bmatrix} \text{ and } \begin{bmatrix} 0 \\ \alpha P_{2,0} \end{bmatrix}.$$

Whether the co-phase $\alpha$ of the polarized antenna array needs to be added for $$\begin{bmatrix} 0 \\ P_{2,0} \end{bmatrix}$$

may be determined by network device, and is unrelated to whether the port indication matrix in the codebook includes $\alpha$.

Transmission Scheme 2: Cyclic Delay Diversity

In the transmission scheme 2, the network device may use at least two precoding vectors to perform precoding on each data layer. Specifically, the cyclic delay diversity is used in OFDM transmission, and a cyclic configuration of a time-domain signal is equivalent to a frequency-based phase offset before OFDM modulation. Therefore, the network device may use at least two independent precoding vectors to perform precoding on each data layer on each subcarrier.

If the rank is 1, the network device needs to determine at least two precoding vectors on one subcarrier based on feedback of the terminal device. If the rank is greater than 1, the network device needs to determine at least two precoding matrices on one subcarrier based on feedback of the terminal device.

Based on the transmission scheme 2, the terminal device may traverse, on each subcarrier, ports included in each polarization direction, and notify, based on channel quality obtained through measurement and an optimal channel quality criterion, the network device of a port corresponding to an equivalent channel with best performance in the polarization direction by using a PMI. In other words, the terminal device needs to obtain at least two independent equivalent channels through measurement, at least one of the at least two independent equivalent channels is corresponding to the first polarization direction, and at least one of the at least two independent equivalent channels is corresponding to the second polarization direction.

For ease of description, assuming that the terminal device may determine two precoding vectors or precoding matrices on one subcarrier, and the two precoding vectors or precoding matrices are respectively corresponding to the first polarization direction and the second polarization direction, the terminal device needs to determine two independent equivalent channels $h_{1,m}$ and $h_{2,n}$ through measurement and calculation. The equivalent channels $h_{1,m}$ and $h_{2,n}$ are respectively expressed as:

$$h_{1,m} = H_{1,k} P_{1,m}, \text{ and}$$

$$h_{2,n} = H_{2,k} P_{2,n},$$

where k represents a k$^{th}$ subcarrier, $H_{1,k}$ represents a channel matrix on the k$^{th}$ subcarrier in the first polarization direction, $H_{2,k}$ represents a channel matrix on the k$^{th}$ subcarrier in the second polarization direction, $P_{1,m}$ represents a precoding vector of an m$^{th}$ port in the first polarization direction, and $P_{2,n}$ represents a precoding vector of an n$^{th}$ port in the second polarization direction.

Assuming that the rank is 1, an equivalent channel on the k$^{th}$ subcarrier may be represented as:

$$h_{k,\mathit{eff}} = [H_{1,k} H_{2,k}][P_{1,m}^T b_k P_{2,n}^T]^T,$$

where $b_k$ is a coefficient, and a value of $b_k$ may be determined by the network device or the terminal device and notified to the other party, or may be specified in a protocol. This is not limited in this application. It can be learned from the foregoing formula that there is a phase rotation angle (e.g., a phase rotation) between the second polarization direction and the first polarization direction, and as a value of k changes, the phase rotation angle may change slowly. Therefore, the network device needs to determine, based on feedback of the terminal device, two precoding vectors $P_{1,m}$ and $P_{2,n}$ that change with a subcarrier, or $h_{k,\mathit{eff}}$ that changes with a subcarrier.

Based on the transmission scheme 2, the terminal device may traverse ports included in each polarization direction, and may determine, through calculation, an equivalent channel vector that is on the $k^{th}$ subcarrier and corresponding to a case in which optimal channel quality reaches a best status based on a measurement criterion. Therefore, two corresponding precoding vectors, namely, $P_{1,m}$ and $P_{2,n}$, may be determined.

After determining two precoding vectors or precoding matrices based on a value of the rank, the transmission scheme 2, the first group of precoded reference signals, and the second group of precoded reference signals, the terminal device may provide feedback to the network device by using any one of the following method 1 and method 2. Alternatively, the network device may determine the two precoding vectors or precoding matrices based on a different feedback mechanism and a received PMI.

A specific method for feeding back a PMI by the terminal device based on two precoding vectors and determining two precoding vectors by the network device based on the PMI is the same as the case in which the rank is 1 and that is described in detail above with reference to the transmission scheme 1. A specific method for feeding back a PMI by the terminal device based on two precoding vectors and determining two precoding vectors by the network device based on the PMI in the transmission scheme 2 is the same as the case. For brevity, details are not described herein again. A situation in which the rank is greater than 1 is described herein with reference to the method 1 and the method 2.

Assuming that the rank is 2, an equivalent channel matrix may be represented as:

$$h_{k,eff} = [H_{1,k} \quad H_{2,k}] \begin{bmatrix} P_{1,m} & P_{1,p} \\ b_{k1}P_{2,n} & b_{k2}P_{2,q} \end{bmatrix},$$

where the first column is corresponding to the first data layer, the second column is corresponding to the second data layer, and m, n, p, and q all represent selected ports. That is, $$\begin{bmatrix} P_{1,m} \\ b_{k1}P_{2,n} \end{bmatrix} \text{ and } \begin{bmatrix} P_{1,p} \\ b_{k2}P_{2,q} \end{bmatrix}$$

are precoding vectors corresponding to two data layers respectively, and constitute a precoding matrix whose rank is 2. Values of $b_{k1}$ and $b_{k2}$ may be the same or different. This is not limited in this application.

The terminal device may feed back a PMI to the network device by using a joint feedback method. The PMI indicates a first matrix, and a column vector in the first matrix is used to indicate two of a plurality of precoding vectors. One of the two precoding vectors is corresponding to the first polarization direction, and the other one of the two precoding vectors is corresponding to the second polarization direction.

Specifically, the PMI may be the same as a PMI in prior approaches. In the transmission scheme 2, the PMI may be used to indicate one matrix (it may be understood that when the rank is greater than 1, two precoding matrices respectively corresponding to two polarization directions need to be fed back). The matrix is another example of the first matrix indicated by the PMI.

It can be deduced from the foregoing descriptions that the PMI fed back by the terminal device includes an index, and the index may indicate a matrix as follows:

$$\frac{1}{\sqrt{2}} \begin{bmatrix} e_m^{(4)} & e_p^{(4)} \\ \alpha e_n^{(4)} & \alpha e_q^{(4)} \end{bmatrix},$$

where the first column is used to determine one precoding vector $$\begin{bmatrix} P_{1,m} \\ \alpha b_{k1}P_{2,n} \end{bmatrix},$$

and the second column is used to determine the other precoding vector $$\begin{bmatrix} P_{1,p} \\ \alpha b_{k2}P_{2,q} \end{bmatrix}.$$

The network device may determine the matrix in the codebook based on the received PMI, and determine a precoding matrix based on a port corresponding to the matrix:

$$\begin{bmatrix} P_{1,m} & P_{1,p} \\ \alpha b_{k1}P_{2,n} & \alpha b_{k2}P_{2,q} \end{bmatrix}.$$

The network device may split, based on the transmission scheme 2, the precoding matrix indicated by the matrix into two precoding matrices as follows:

$$\begin{bmatrix} P_{1,m} & P_{1,p} \\ 0 & 0 \end{bmatrix} \text{ and } \begin{bmatrix} 0 & 0 \\ \alpha b_{k1}P_{2,n} & \alpha b_{k2}P_{2,q} \end{bmatrix}; \text{ or } \begin{bmatrix} P_{1,m} & P_{1,p} \\ 0 & 0 \end{bmatrix} \text{ and } \begin{bmatrix} 0 & 0 \\ b_{k1}P_{2,n} & b_{k2}P_{2,q} \end{bmatrix},$$

where $$\begin{bmatrix} P_{1,m} & P_{1,p} \\ 0 & 0 \end{bmatrix}$$

is a precoding matrix corresponding to the first polarization direction, and $$\begin{bmatrix} 0 & 0 \\ \alpha b_{k1}P_{2,n} & \alpha b_{k2}P_{2,q} \end{bmatrix} \text{ or } \begin{bmatrix} 0 & 0 \\ b_{k1}P_{2,n} & b_{k2}P_{2,q} \end{bmatrix}$$

is a precoding matrix corresponding to the second polarization direction. Therefore, the network device may determine, based on the PMI fed back by the terminal device, the two precoding matrices used for the transmission scheme 2. It can be learned that, the two precoding matrices are respectively corresponding to the two polarization directions, and whether a co-phase $\alpha$ of a polarized antenna array needs to be added may be determined by the network device. However, regardless of whether the co-phase $\alpha$ of the polarized antenna array is added, the two precoding matrices are independent of each other.

Transmission Scheme 3:

Polarization Direction-Based Precoder Cycling

In the transmission scheme 3, the network device may use at least two precoding vectors to perform precoding on each data layer. Specifically, the polarization direction-based precoder cycling may be understood as that data is precoded by alternately using a plurality of precoding vectors corresponding to different polarization directions based on a precoder cycling granularity.

If the rank is 1, the network device needs to determine at least two precoding vectors based on feedback of the terminal device. If the rank is greater than 1, the network device needs to determine at least two precoding matrices based on feedback of the terminal device. Therefore, the terminal device may notify, by using a PMI and based on channel quality obtained through measurement and an optimal channel quality criterion, the network device of a port corresponding to an equivalent channel with best performance in each polarization direction.

For ease of description, assuming that the terminal device determines two precoding vectors or precoding matrices, the terminal device needs to obtain two independent equivalent channels $h_{1,m}$ and $h_{2,n}$ through measurement, one of the two independent equivalent channels is corresponding to the first polarization direction, and the other one of the at least two independent equivalent channels is corresponding to the second polarization direction.

Based on the transmission scheme 3, the terminal device may traverse ports included in each polarization direction, and determine at least two equivalent channel vectors (corresponding to a case in which the rank is 1) or equivalent channel matrices (corresponding to a case in which the rank is greater than 1) corresponding to an optimal port in a measurement criterion. Therefore, the at least two corresponding precoding vectors (corresponding to the case in which the rank is 1) or precoding matrices (corresponding to the case in which the rank is greater than 1) may be determined, and are assumed to be $W_{1,m}$ and $W_{2,n}$. It may be understood that when the rank is 1, both $W_{1,m}$ and $W_{2,n}$ are precoding vectors; or when the rank is greater than 1, $W_{1,m}$ and $W_{2,n}$ are precoding matrices.

It is assumed that the two independent equivalent channels $h_{1,m}$ and $h_{2,n}$ obtained by the terminal device through measurement are respectively:

$h_{\it{eff}} = h_{1,m} = [H_1 H_2][W_{1,m}{}^T 0^T]^T$, and $h_{\it{eff}} = h_{2,n} = [H_1 H_2][0^T W_{2,n}{}^T]^T$.

After determining the at least two precoding vectors or precoding matrices based on a value of the rank, the transmission scheme 3, the first group of precoded reference signals, and the second group of precoded reference signals, the terminal device may provide feedback to the network device by using any one of the following method 1 and method 2. Alternatively, the network device may determine the at least two precoding vectors or precoding matrices based on a different feedback mechanism and a received PMI.

The terminal device may feed back a PMI to the network device by using a joint feedback method. The PMI indicates a first matrix, and a column vector in the first matrix is used to indicate two of a plurality of precoding vectors. One of the two precoding vectors is corresponding to the first polarization direction, and the other one of the two precoding vectors is corresponding to the second polarization direction.

Specifically, a specific method for feeding back the PMI to the network device by the terminal device in a joint feedback manner is the same as a specific method for feeding back the PMI by the terminal device in the transmission scheme 2. A specific method for determining the plurality of precoding vectors or precoding matrices by the network device based on the received PMI is the same as a specific method for determining the plurality of precoding vectors or precoding matrices by the network device based on the received PMI in the transmission scheme 2. For brevity, detailed descriptions of a specific process thereof are omitted herein.

It should be further understood that in foregoing descriptions with reference to the transmission scheme 2 and the transmission scheme 3, only feedback of two precoding vectors or precoding matrices is used as an example for description. However, this should not be construed as any limitation on this application. When the terminal device feeds back at least two precoding vectors or precoding matrices, at least one precoding vector or precoding matrix may be obtained through measurement in different polarization directions separately.

It should be further understood that the foregoing describes, in detail with reference to three different types of diversity transmission schemes, a specific process of feeding back the PMI and determining the precoding vectors based on the PMI. However, this should not be construed as any limitation on this application. The terminal device may further feed back the PMI for precoder cycling. For example, in a precoder cycling-based space-time diversity transmission scheme or a precoder cycling-based space-frequency diversity transmission scheme, the terminal device may first feed back a PMI for space-time diversity or space-frequency diversity, and then further feed back a PMI for precoder cycling. A feedback (or measurement)-based transmission scheme is not limited in this application.

It may be learned from the several transmission schemes listed above, the plurality of precoding vectors (or referred to as two precoding matrices) determined by the network device is irrelevant to the co-phase of the polarized antenna array in the codebook, and the network device may autonomously determine whether to add the co-phase of the polarized antenna array to the precoding vector in the second polarization direction. In other words, the precoding vectors of the two polarization directions are independent of each other. If the terminal device is still based on the codebook of the four antenna ports that is defined in the LTE protocol, when RI=1, the terminal device performs channel measurement for precoding vectors corresponding to eight port indication matrices indicated by PMIs=0 to 7. Because the co-phase $\alpha$ of the polarized antenna array is ignored, precoding vectors corresponding to four port indication matrices indicated by PMIs=0 to 3 may be the same, and precoding vectors corresponding to four port indication matrices indicated by PMIs=4 to 7 may also be the same. In other words, a channel measurement calculation process performed by the terminal device separately when traversing PMIs of 0 to 3 may be repeated, and a channel measurement calculation process performed separately when traversing PMIs of 4 to 7 may also be repeated.

Correspondingly, if the terminal device performs channel measurement by using the candidate element set of the four antenna ports that is provided in this application, when the rank is determined, an optimal equivalent channel matrix in a measurement criterion may be determined only by performing channel measurement based on a few PMIs shown in Table 2 above. Therefore, the candidate element set determined and obtained based on the codebook restriction method provided in this application helps reduce calculation complexity of terminal device and improve efficiency of channel measurement.

Therefore, according to the communication method provided in this embodiment of this application, the terminal device feeds back the plurality of precoding vectors based on the CSI feedback-based transmission scheme, and the plurality of precoding vectors may be corresponding to at least one of the first group of precoded reference signals and at least one of the second group of precoded reference signals. Compared with feedback of only one precoding vector in prior approaches, this better meets a requirement of a diversity transmission scheme, and can provide, for the diversity transmission scheme, the plurality of precoding vectors used for data transmission, to obtain a space diversity gain. This helps improve data transmission reliability, thereby helping improve robustness of a communications system. In addition, by restricting some elements in an existing codebook, the terminal device performs channel measurement based on the candidate element set. This helps reduce complexity of the channel measurement and improve efficiency of the channel measurement.

The foregoing describes, in detail with reference to FIG. 4, a process in which the communication method provided in the embodiments of this application is used for downlink channel measurement. The following describes, in detail with reference to FIG. 5, a process in which the communication method provided in the embodiments of this application is used for uplink channel measurement.

Figure 5:
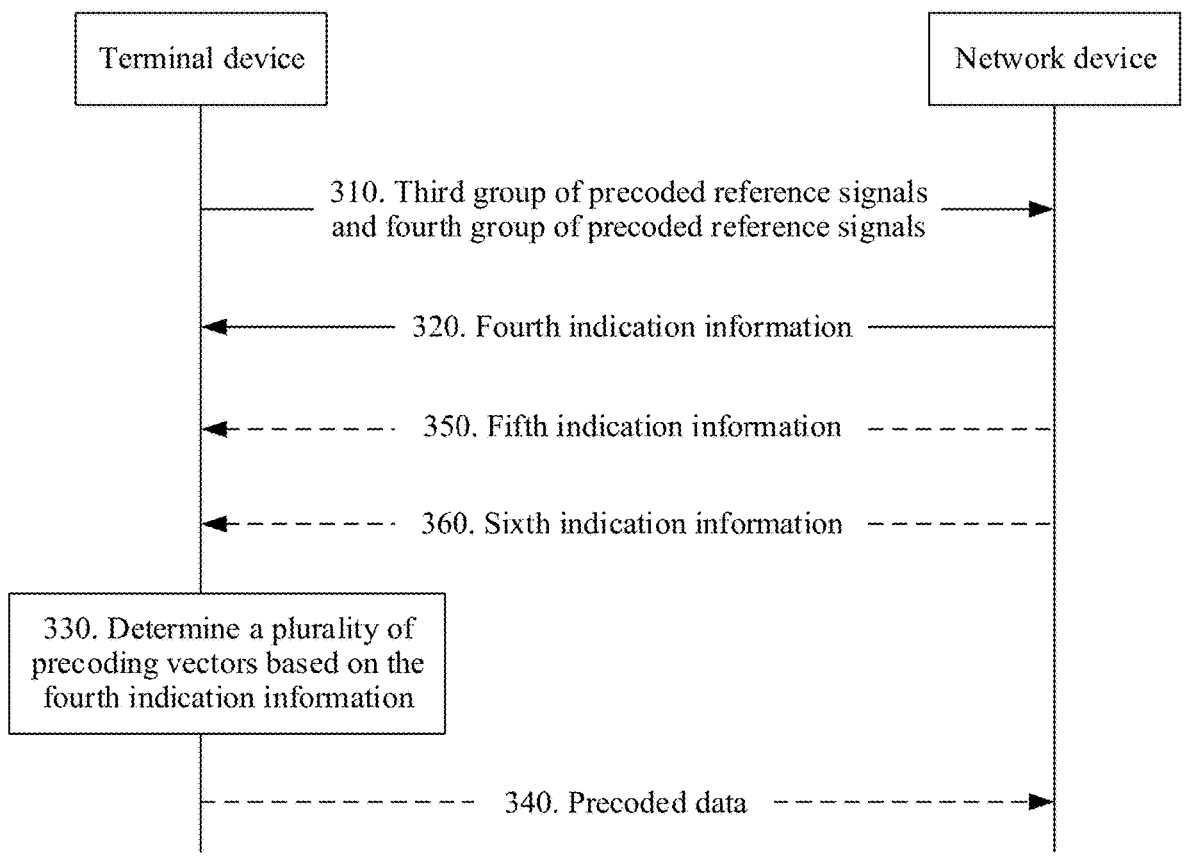
FIG. 5 is a schematic flowchart of a communication method according to another embodiment of this application.

FIG. 5 is a schematic flowchart of a communication method 300 according to another embodiment of this application from a perspective of device interaction. Specifically, FIG. 5 shows an uplink channel measurement process. As shown in FIG. 5, the communication method 300 may include step 310 to step 360.

In step 310, a terminal device sends a third group of precoded reference signals and a fourth group of precoded reference signals.

Correspondingly, in step 310, a network device receives the third group of precoded reference signals and the fourth group of precoded reference signals.

The third group of precoded reference signals includes at least one precoded reference signal, and the fourth group of precoded reference signals includes at least one precoded reference signal.

Optionally, the third group of precoded reference signals is corresponding to a first polarization direction, and the fourth group of precoded reference signals is corresponding to a second polarization direction.

Optionally, the first polarization direction is a horizontal polarization direction, and the second polarization direction is a vertical polarization direction.

In step 320, the network device sends fourth indication information based on a measurement-based transmission scheme. The fourth indication information is used to determine a plurality of precoding vectors, at least one of the plurality of precoding vectors is determined by using a precoding vector corresponding to at least one of the third group of precoded reference signals, and at least one of the plurality of precoding vectors is determined by using a precoding vector corresponding to at least one of the fourth group of precoded reference signals.

Correspondingly, in step 320, the terminal device receives the fourth indication information from the network device.

In this embodiment, the network device may determine a candidate element set based on the measurement-based transmission scheme, and perform channel measurement based on the candidate element set, to determine the fourth indication information and send the fourth indication information to the terminal device.

In step 330, the terminal device determines a plurality of precoding vectors based on the fourth indication information.

Optionally, the method 300 further includes step 340: The terminal device precodes to-be-sent data based on the plurality of precoding vectors, and sends precoded data.

It should be noted that the CSI measurement-based transmission scheme may be predefined (for example, defined in a protocol), or may be determined by the network device. Therefore, in uplink channel measurement, the network device may directly perform channel measurement based on the CSI measurement-based transmission scheme and a reference signal sent by the terminal device. However, it should be understood that a quantity of transmission schemes based on which the network device performs channel measurement is not limited in this application, and the network device may perform channel measurement based on a plurality of transmission schemes and a received reference signal.

It should be further noted that, the candidate element set may be predefined (for example, defined in the protocol), or may be implicitly or explicitly notified to the terminal device after the candidate element set is determined by the network device, so that the terminal device determines precoding vectors used for data transmission. Therefore, in uplink channel measurement, the CSI measurements-based transmission scheme and/or the candidate element set may be indicated by network device to the terminal device.

Optionally, before step 330, the method 300 further includes step 350: The network device sends fifth indication information, where the fifth indication information indicates the CSI measurement-based transmission scheme.

That the network device indicates the CSI measurement-based transmission scheme to terminal device may be understood as a possible embodiment of implicitly indicating a restricted codebook. The terminal device may receive the fifth indication information in step 350, and determine, based on the fifth indication information and according to the foregoing rules, a candidate element set corresponding to the CSI measurement-based transmission scheme.

Optionally, before step 330, the method 300 further includes step 360: The network device sends sixth indication information, where the sixth indication information indicates at least one candidate element.

The network device may alternatively explicitly indicate the restricted codebook to terminal device directly. The terminal device may receive the sixth indication information in step 360, to obtain the candidate element set.

It should be understood that the third group of precoded reference signals, the fourth group of precoded reference signals, and the fourth indication information are merely used for differentiation from the first group of precoded reference signals, the second group of precoded reference signals, and the first indication information in the method 200. This should not be construed as any limitation on this application.

It should be further understood that the method 300 for data transmission may be applicable to uplink transmission, or may be applicable to downlink transmission based on channel reciprocity. After performing channel measurement based on a reference signal that is sent by the terminal device and that is used for uplink channel measurement, the network device may determine CSI of a downlink channel by using the channel reciprocity, to deduce a precoding matrix used for downlink data transmission.

It should be further understood that a specific process of each step in the method 300 is similar to a specific process of each step in the method 200. For brevity, detailed descriptions of each step in the method 300 are omitted herein.

Therefore, according to the communication method provided in this embodiment of this application, the network device indicates the plurality of precoding vectors based on the CSI measurement-based transmission scheme, and the plurality of precoding vectors may be corresponding to at least one of the third group of precoded reference signals and at least one of the fourth group of precoded reference signals. Compared with feedback of only one precoding vector in prior approaches, this better meets a requirement of a diversity transmission scheme, and can provide, for the diversity transmission scheme, the plurality of precoding vectors used for data transmission, to obtain a space diversity gain. This helps improve data transmission reliability, thereby helping improve robustness of a communications system. In addition, by restricting some elements in an existing codebook, the terminal device performs channel measurement based on the candidate element set. This helps reduce complexity of the channel measurement and improve efficiency of the channel measurement.

It should be understood that, for ease of description, in this application, the method for data transmission in this embodiment of this application is described by using polarization direction-based diversity transmission as an example. However, a transmission scheme to which the method for data transmission provided in this application is applicable is not limited to the polarization direction-based diversity transmission. For example, a transmit end may send a plurality of groups of precoded reference signals based on different antenna panels, to obtain CSI based on the different antenna panels, or send a plurality of groups of precoded reference signals based on different groups (for example, grouping based on polarization directions or not based on polarization directions) of a same antenna panel, to obtain CSI of different groups.

It should be further understood that the grouping based on polarization directions, the grouping based on antenna panels, and the like that are listed above may be grouping of antenna ports of a same network device (for example, a same TRP), or may be grouping of antenna ports of a same network device into one group. This is not limited in this application.

It should also be understood that sequence numbers of each process does not mean execution sequences in various embodiments of this application. The execution sequences of the processes should be determined based on functions and internal logic of the processes, and should not be construed as any limitation on the implementation processes of the embodiments of this application.

The methods for data transmission provided in the embodiments of this application are described above in detail with reference to FIG. 4 to FIG. 5. A network device and a terminal device that are provided in the embodiments of this application are described in detail below with reference to FIG. 6 to FIG. 9.

Figure 6:
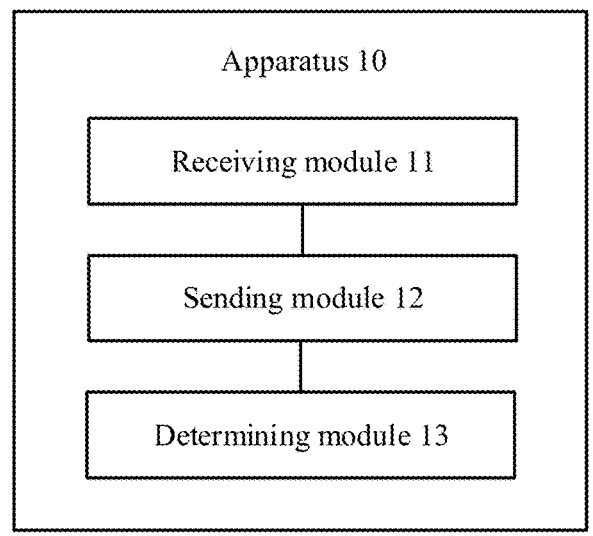
FIG. 6 is a schematic block diagram of an apparatus according to an embodiment of this application.

According to the foregoing methods, FIG. 6 is a schematic block diagram of an apparatus 10 according to an embodiment of this application. As shown in FIG. 6, the apparatus 10 may be a terminal device, or may be a chip or a circuit, for example, a chip or a circuit that may be disposed in a terminal device. The terminal device may be corresponding to the terminal device in the foregoing method.

Specifically, the apparatus 10 may include a receiving module 11 and a sending module 12.

The receiving module 11 is configured to receive a first group of precoded reference signals and a second group of precoded reference signals, where the first group of precoded reference signals includes at least one precoded reference signal, and the second group of precoded reference signals includes at least one precoded reference signal.

The sending module 12 is configured to feed back first indication information based on a channel state information CSI feedback-based transmission scheme, where the first indication information is used to determine a plurality of precoding vectors, at least one of the plurality of precoding vectors is determined by using a precoding vector corresponding to at least one of the first group of precoded reference signals, and at least one of the plurality of precoding vectors is determined by using a precoding vector corresponding to at least one of the second group of precoded reference signals.

The first indication information is used to indicate a first element in a codebook, the first element is used to determine at least one port, each port indicates a precoding vector corresponding to one precoded reference signal, at least one candidate element including the first element is predefined in a codebook corresponding to a same rank, and when a quantity of the at least one candidate element is at least 2, ports indicated by any two of the at least one candidate element are at least partially different.

It should be understood that the apparatus 10 may be corresponding to the terminal device in the communication method 200 in the embodiments of this application, and the apparatus 10 may include modules configured to perform the method performed by the terminal device in the communication method 200 in FIG. 4. In addition, the modules in the apparatus 10 and the foregoing other operations and/or functions are respectively intended to implement corresponding procedures of the communication method 200 in FIG. 4. Specifically, the receiving module 11 is configured to perform step 210, step 230, step 240, and step 260 in the method 200, and the sending module 12 is configured to perform step 220 in the method 200. A specific process of performing the foregoing corresponding step by each module has been described in detail in the method 200. For brevity, details are not described herein again.

Alternatively, the apparatus 10 may include a sending module 12, a receiving module 11, and a determining module 13.

The sending module 12 is configured to send a third group of precoded reference signals and a fourth group of precoded reference signals, where the third group of precoded reference signals includes at least one precoded reference signal, and the fourth group of precoded reference signals includes at least one precoded reference signal.

The receiving module 11 is configured to receive fourth indication information from a network device.

The determining module 13 is configured to determine a plurality of precoding vectors based on the fourth indication information, where at least one of the plurality of precoding vectors is determined by using a precoding vector corresponding to at least one of the third group of precoded reference signals, and at least one of the plurality of precoding vectors is determined by using a precoding vector corresponding to at least one of the fourth group of precoded reference signals.

The fourth indication information is used to indicate a second element in a codebook, the second element is used to determine at least one port, each port indicates a precoding vector corresponding to one precoded reference signal, at least one candidate element including the second element is predefined in a codebook corresponding to a same rank, and when a quantity of the at least one candidate element is at least 2, ports indicated by any two of the at least one candidate element are at least partially different.

It should be understood that the apparatus 10 may be corresponding to the terminal device in the communication method 300 in the embodiments of this application, and the network device may include modules configured to perform the method performed by the terminal device in the communication method 300 in FIG. 5. In addition, the modules in the apparatus 10 and the foregoing other operations and/or functions are respectively intended to implement corresponding procedures of the communication method 300 in FIG. 5. Specifically, the sending module 11 is configured to perform step 310 and step 340 in the method 300, the receiving module 12 is configured to perform step 320, step 350, and step 360 in the method 300, and the determining module 13 is configured to perform step 330 in the method 300. A specific process of performing the foregoing corresponding step by each module has been described in detail in the method 300. For brevity, details are not described herein again.

Figure 7:
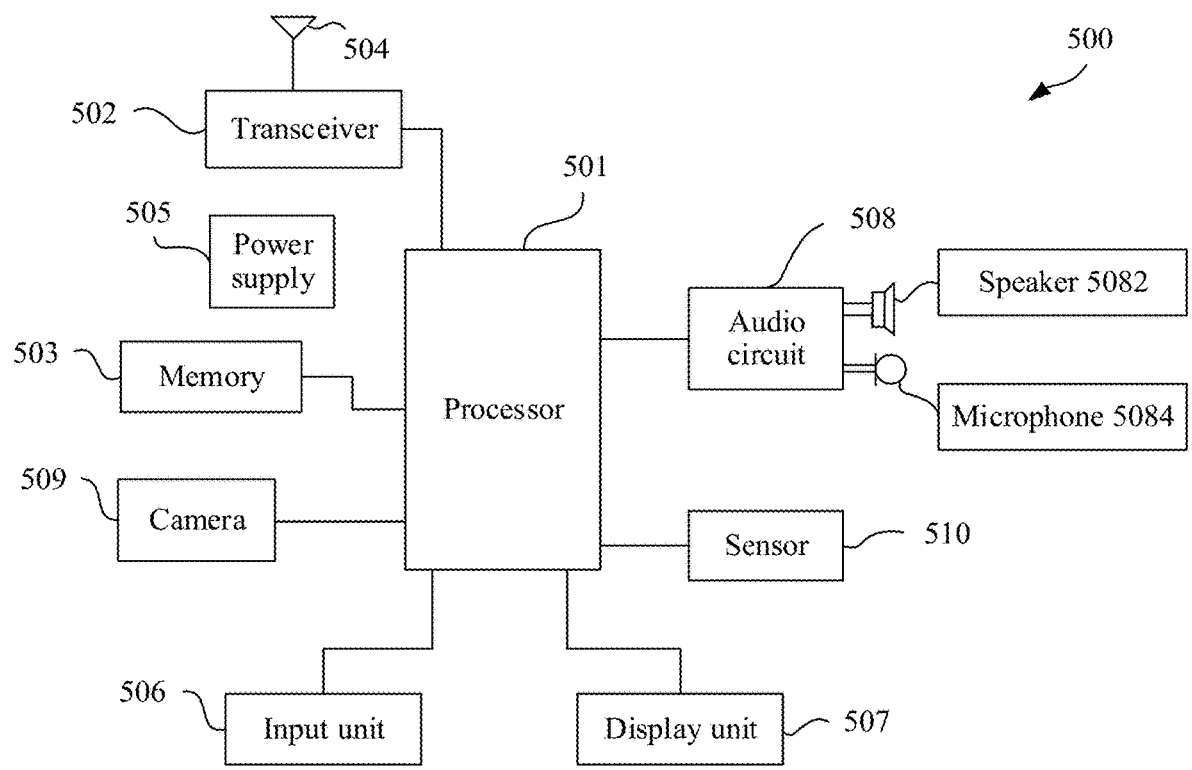
FIG. 7 is a schematic structural diagram of a terminal device according to an embodiment of this application.

FIG. 7 is a schematic structural diagram of a terminal device 500 according to an embodiment of this application. As shown in FIG. 7, the terminal device 500 includes a processor 501 and a transceiver 502. Optionally, the terminal device 500 further includes a memory 503. The processor 501, the transceiver 502, and the memory 503 communicate with each other through an internal connection path, and transfer a control signal and/or a data signal. The memory 503 is configured to store a computer program. The processor 501 is configured to invoke the computer program from the memory 503 and run the computer program, to control the transceiver 502 to receive and send a signal.

The processor 501 and the memory 503 may be integrated into one processing apparatus, and the processor 501 is configured to execute program code stored in the memory 503, to implement the foregoing function. During embodiments of implementation, the memory 503 may alternatively be integrated into the processor 501, or may be independent of the processor 501. The terminal device 500 may further include an antenna 504, configured to send, by using a radio signal, uplink data or uplink control signaling output by the transceiver 502.

Specifically, the terminal device 500 may be corresponding to the terminal device in the communication method 200 in the embodiments of this application, and the terminal device 500 may include modules configured to perform the method performed by the terminal device in the communication method 200 in FIG. 4. In addition, the modules in the terminal device 500 and the foregoing other operations and/or functions are respectively to implement corresponding procedures of the communication method 200 in FIG. 4. Specifically, the memory 503 is configured to store program code, so that when the processor 501 executes the program code, the transceiver 502 is controlled to perform step 210 to step 240 and step 260 in the method 200 by using the antenna 504. A specific process of performing the corresponding step by each module has been described in detail in the method 200. For brevity, details are not described herein.

Alternatively, the terminal device 500 may be corresponding to the terminal device in the communication method 300 in the embodiments of this application, and the terminal device 500 may include modules configured to perform the method performed by the terminal device in the communication method 300 in FIG. 5. In addition, the modules in the terminal device 500 and the foregoing other operations and/or functions are respectively to implement corresponding procedures of the communication method 300 in FIG. 5. Specifically, the memory 503 is configured to store program code, so that when the processor 501 executes the program code, the transceiver 502 is controlled to perform step 310, step 320, and step 340 to step 360 in the method 300 by using the antenna 504, and to perform step 330. A specific process of performing the corresponding step by each module has been described in detail in the method 300. For brevity, details are not described herein.

The processor 501 may be configured to perform an action internally implemented by the terminal in the foregoing method embodiments, and the transceiver 502 may be configured to perform a transmitting action or a sending action by the terminal to the network device in the foregoing method embodiments. For details, refer to the descriptions in the foregoing method embodiments. Details are not described herein.

The processor 501 and the memory 503 may be integrated into one processing apparatus, and the processor 501 is configured to execute the program code stored in the memory 503, to implement the foregoing function. During embodiments of implementation, the memory 503 may alternatively be integrated into the processor 501.

The terminal device 500 may further include a power supply 505, configured to supply power to various components or circuits in the terminal.

In addition, to make functions of the terminal device more perfect, the terminal device 500 may further include one or more of an input unit 506, a display unit 507, an audio circuit 508, a camera 509, a sensor 510, and the like, and the audio circuit may further include a speaker 5082, a microphone 5084, and the like.

Figure 8:
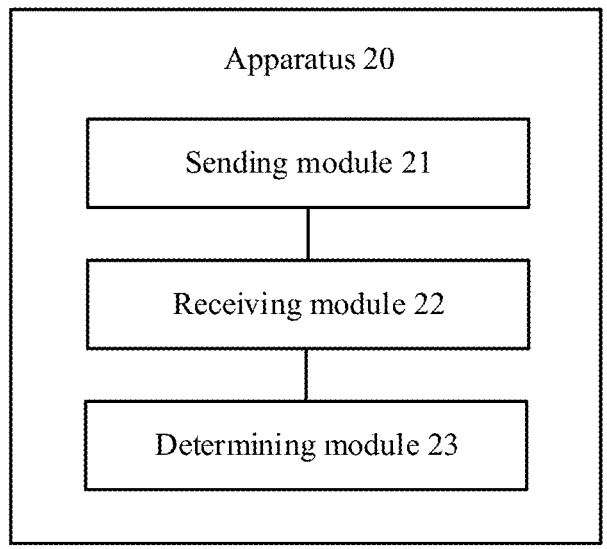
FIG. 8 is a schematic block diagram of an apparatus according to another embodiment of this application.

FIG. 8 is a schematic block diagram of an apparatus 20 according to an embodiment of this application. As shown in FIG. 8, the apparatus 20 may be a network device, or may be a chip or a circuit, for example, a chip or a circuit that may be disposed in a network device. The apparatus 20 is corresponding to the network device in the foregoing method.

Specifically, the apparatus 20 may be configured in a communications system including a terminal device and the apparatus 20, and the terminal device and the apparatus 20 pre-store a plurality of precoding matrices. The apparatus 20 may include a sending module 21, a receiving module 22, and a determining module 23.

The sending module 21 is configured to send a first group of precoded reference signals and a second group of precoded reference signals, where the first group of precoded reference signals includes at least one precoded reference signal, and the second group of precoded reference signals includes at least one precoded reference signal.

The receiving module 22 is configured to receive first indication information fed back by the terminal device.

The determining module 23 is configured to determine a plurality of precoding vectors based on the first indication information, where at least one of the plurality of precoding vectors is determined by using a precoding vector corresponding to at least one of the first group of precoded reference signals, and at least one of the plurality of precoding vectors is determined by using a precoding vector corresponding to at least one of the second group of precoded reference signals.

The first indication information is used to indicate a first element in a codebook, the first element is used to determine at least one port, each port indicates a precoding vector corresponding to one precoded reference signal, at least one candidate element including the first element is predefined in a codebook corresponding to a same rank, and when a quantity of the at least one candidate element is at least 2, ports indicated by any two of the at least one candidate element are at least partially different.

It should be understood that the apparatus 20 may be corresponding to the network device in the communication method 200 in the embodiments of this application, and the apparatus 20 may include modules configured to perform the method performed by the network device in the communication method 200 in FIG. 4. In addition, the modules in the apparatus 20 and the foregoing other operations and/or functions are respectively intended to implement corresponding procedures of the communication method 200 in FIG. 4. Specifically, the sending module 21 is configured to perform step 210, step 230, step 240, and step 260 in the method 200, the receiving module 22 is configured to perform step 220 in the method 200, and the determining module 23 is configured to perform step 250 in the method 200. A specific process of performing the corresponding step by each module has been described in detail in the method 200. For brevity, details are not described herein.

Alternatively, the apparatus 20 may be configured in a communications system including a terminal device and the apparatus 20, and the terminal device and the apparatus 20 pre-store a plurality of precoding matrices. The apparatus 20 may include a sending module 21 and a receiving module 22.

The receiving module 22 is configured to receive a third group of precoded reference signals and a fourth group of precoded reference signals, where the third group of precoded reference signals includes at least one precoded reference signal, and the fourth group of precoded reference signals includes at least one precoded reference signal.

The sending module 21 is configured to send fourth indication information based on a CSI measurement-based transmission scheme, where the fourth indication information is used to determine a plurality of precoding vectors, at least one of the plurality of precoding vectors is determined by using a precoding vector corresponding to at least one of the third group of precoded reference signals, and at least one of the plurality of precoding vectors is determined by using a precoding vector corresponding to at least one of the fourth group of precoded reference signals.

The fourth indication information is used to indicate a second element in a codebook, the second element is used to determine at least one port, each port indicates a precoding vector corresponding to one precoded reference signal, at least one candidate element including the second element is predefined in a codebook corresponding to a same rank, and when a quantity of the at least one candidate element is at least 2, ports indicated by any two of the at least one candidate element are at least partially different.

It should be understood that the apparatus 20 may be corresponding to the network device in the communication method 300 in the embodiments of this application, and the apparatus 20 may include modules configured to perform the method performed by the network device in the communication method 300 in FIG. 5. In addition, the modules in the apparatus 20 and the foregoing other operations and/or functions are respectively intended to implement corresponding procedures of the communication method 300 in FIG. 5. Specifically, the sending module 21 is configured to perform step 320, step 350, and step 360 in the method 300, and the receiving module 22 is configured to perform step 310 and step 340 in the method 300. A specific process of performing the foregoing corresponding step by each module has been described in detail in the method 300. For brevity, details are not described herein again.

Figure 9:
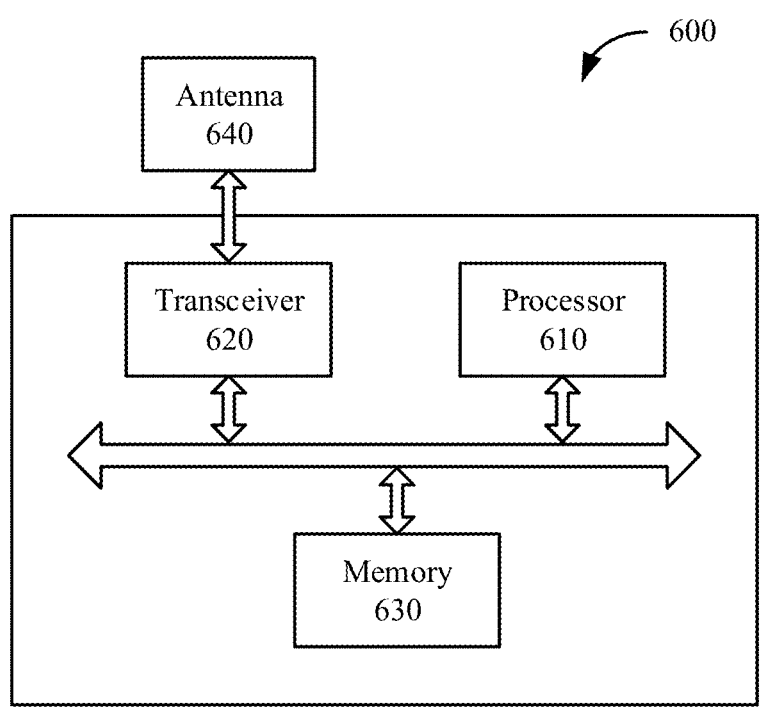
FIG. 9 is a schematic structural diagram of a network device according to an embodiment of this application.

FIG. 9 is a schematic structural diagram of a network device 600 according to an embodiment of this application. As shown in FIG. 9, the network device 600 includes a processor 610 and a transceiver 620. Optionally, the network device 600 further includes a memory 630. The processor 610, the transceiver 620, and the memory 630 communicate with each other through an internal connection path, and transfer a control signal and/or a data signal. The memory 630 is configured to store a computer program. The processor 610 is configured to invoke the computer program from the memory 630 and run the computer program, to control the transceiver 620 to receive and send a signal.

The processor 610 and the memory 630 may be integrated into one processing apparatus, and the processor 610 is configured to execute program code stored in the memory 630, to implement the foregoing function. During embodiments of implementation, the memory 630 may alternatively be integrated into the processor 610, or may be independent of the processor 610.

The network device may further include an antenna 640, configured to send, by using a radio signal, downlink data or downlink control signaling output by the transceiver 620.

Specifically, the network device 600 may be corresponding to the network device in the communication method 200 in the embodiments of this application, and the network device 600 may include modules configured to perform the method performed by the network device in the communication method 200 in FIG. 4. In addition, the modules in the network device 600 and the foregoing other operations and/or functions are respectively to implement corresponding procedures of the communication method 200 in FIG. 4. Specifically, the memory 630 is configured to store program code, so that when the processor 610 executes the program code, the transceiver 620 is controlled to perform step 210 to step 240 and step 260 in the method 200 by using the antenna 640, and to perform step 250 in the method 200. A specific process of performing the corresponding step by each module has been described in detail in the method 200. For brevity, details are not described herein.

Alternatively, the network device 600 may be corresponding to the network device in the communication method 300 in the embodiments of this application, and the network device 600 may include modules configured to perform the method performed by the network device in the communication method 300 in FIG. 5. In addition, the modules in the network device 600 and the foregoing other operations and/or functions are respectively to implement corresponding procedures of the communication method 300 in FIG. 5. Specifically, the memory 630 is configured to store program code, so that when the processor 610 executes the program code, the transceiver 620 is controlled to perform step 310, step 320, and step 340 to step 360 in the method 300 by using the antenna 640. A specific process of performing the corresponding step by each module has been described in detail in the method 300. For brevity, details are not described herein.

According to the method provided in the embodiments of this application, an embodiment of this application further provides a system. The system includes the foregoing network device and one or more terminal devices.

It should be understood that, the processor in the embodiments of this application may be a central processing unit (central processing unit, CPU), or may be another general purpose processor, a digital signal processor (digital signal processor, DSP), an application-specific integrated circuit (application specific integrated circuit, ASIC), a field programmable gate array (field programmable gate array, FPGA), or another programmable logical device, a discrete gate or transistor logical device, a discrete hardware component, or the like. The general purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

A person of ordinary skill in the art may be aware that, in combination with the units and algorithm steps in the examples described in the embodiments disclosed in this specification, this application may be implemented by electronic hardware or a combination of electronic hardware and computer software. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, for example, a universal serial bus (USB) flash drive, a removable hard disk, a read-only memory (ROM), a random access memory (RAM), a magnetic disk, or an optical disc.

The foregoing descriptions are merely specific embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a terminal device from a network device, a first group of precoded reference signals and a second group of precoded reference signals, wherein the first group of precoded reference signals comprises at least one precoded reference signal, and the second group of precoded reference signals comprises at least one precoded reference signal;
performing, by the terminal device, equivalent channel measurement based on the first group of precoded reference signals and the second group of precoded reference signals based on a channel state information (CSI) feedback-based transmission scheme, wherein the CSI feedback-based transmission scheme is space frequency diversity, space-time diversity, or cyclic delay diversity; and
feeding back, by the terminal device to the network device, first indication information, the first indication information indicating a result of the equivalent channel measurement, wherein the first indication information is used to:
determine a plurality of precoding vectors, at least one of the plurality of precoding vectors is determined by using a precoding vector corresponding to at least one of the first group of precoded reference signals, and at least one of the plurality of precoding vectors is determined by using a precoding vector corresponding to at least one of the second group of precoded reference signals, and indicate, as a result of the equivalent channel measurement, a first element in a codebook, the first element determines at least one port, each port indicates a precoding vector corresponding to one precoded reference signal, at least one candidate element comprising the first element is predefined in a codebook corresponding to a same rank, and when a quantity of the at least one candidate element is at least 2, and wherein for each candidate element among at least two candidate elements, those ports indicated by the candidate element are at least partially different to those ports of each other candidate element among the at least two candidate elements.

2. The method according to claim 1, wherein when the rank is greater than 1, in the codebook corresponding to the same rank, any candidate element comprises a plurality of column vectors, each of the plurality of column vectors indicates at least two ports, and ports indicated by any two column vectors in a same candidate element are at least partially different.

3. The method according to claim 1, wherein the first group of precoded reference signals corresponds to a first polarization direction, and the second group of precoded reference signals corresponds to a second polarization direction.

4. The method according to claim 1, wherein the first indication information is a first precoding matrix indicator (PMI), and a one-to-one correspondence between at least one PMI and the at least one candidate element is pre-stored in the codebook.

5. The method according to claim 4, wherein each column vector in the first element indicated by the first PMI is used to indicate at least two of the plurality of precoding vectors, one of the at least two precoding vectors corresponds to one of the first group of precoded reference signals, and another one of the at least two precoding vectors corresponds to one of the second group of precoded reference signals.

6. The method according to claim 1, wherein the method further comprises:
receiving, by the terminal device, second indication information, wherein the second indication information indicates the CSI feedback-based transmission scheme.

7. A communication method, comprising:
sending, by a network device to a terminal device, a first group of precoded reference signals and a second group of precoded reference signals, wherein the first group of precoded reference signals comprises at least one precoded reference signal, and the second group of precoded reference signals comprises at least one precoded reference signal;
receiving, by the network device, first indication information fed back by the terminal device, the first indicating information indicating a result of an equivalent channel measurement performed by the terminal device, the equivalent channel measurement being performed based on the first group of precoded reference signals and the second group of precoded reference signals and based on a channel state information (CSI) feedback-based transmission scheme, wherein the CSI feedback-based transmission scheme is space frequency diversity, space-time diversity, or cyclic delay diversity, wherein the first indication information:
determines a plurality of precoding vectors, at least one of the plurality of precoding vectors is determined by using a precoding vector corresponding to at least one of the first group of precoded reference signals, and at least one of the plurality of precoding vectors is determined by using a precoding vector corresponding to at least one of the second group of precoded reference signals, and indicates, as a result of the equivalent channel measurement, a first element in a codebook, the first element determines at least one port, each port indicates a precoding vector corresponding to one precoded reference signal, at least one candidate element comprising the first element is predefined in a codebook corresponding to a same rank, and when a quantity of the at least one candidate element is at least 2, and wherein for each candidate element among at least two candidate elements, those ports indicated by the candidate element are at least partially different to those ports of each other candidate element among the at least two candidate elements; and determining, by the network device, the plurality of precoding vectors based on the first indication information.

8. The method according to claim 7, wherein when the rank is greater than 1, in the codebook corresponding to the same rank, any candidate element comprises a plurality of column vectors, each of the plurality of column vectors indicates at least two ports, and ports indicated by any two column vectors in a same candidate element are at least partially different.

9. The method according to claim 7, wherein the first group of precoded reference signals corresponds to a first polarization direction, and the second group of precoded reference signals corresponds to a second polarization direction.

10. The method according to claim 7, wherein the first indication information is a first precoding matrix indicator (PMI), and a one-to-one correspondence between at least one PMI and the at least one candidate element is pre-stored in the codebook.

11. The method according to claim 10, wherein each column vector in the first element indicated by the first PMI indicates at least two of the plurality of precoding vectors, one of the at least two precoding vectors corresponds to one of the first group of precoded reference signals, and another one of the at least two precoding vectors corresponds to one of the second group of precoded reference signals.

12. The method according to claim 7, wherein the method further comprises:
sending, by the network device, second indication information, wherein the second indication information indicates the CSI feedback-based transmission scheme.

13. A terminal device, comprising:
a processor;
a memory, configured to store at least one computer instruction, which when executed, causes the processor to perform following method:
receiving, from a network device, a first group of precoded reference signals and a second group of precoded reference signals, wherein the first group of precoded reference signals comprises at least one precoded reference signal, and the second group of precoded reference signals comprises at least one precoded reference signal;
performing equivalent channel measurement based on the first group of precoded reference signals and the second group of precoded reference signals based on a channel state information (CSI) feedback-based transmission scheme, wherein the CSI feedback-based transmission scheme is space frequency diversity, space-time diversity, or cyclic delay diversity; and feeding back, to the network device, first indication information, the first indication information indicating a result of the equivalent channel measurement, wherein the first indication information is used to:

determine a plurality of precoding vectors, at least one of the plurality of precoding vectors is determined by using a precoding vector corresponding to at least one of the first group of precoded reference signals, and at least one of the plurality of precoding vectors is determined by using a precoding vector corresponding to at least one of the second group of precoded reference signals, and indicate, as a result of the equivalent channel measurement, a first element in a codebook, the first element determines at least one port, each port indicates a precoding vector corresponding to one precoded reference signal, at least one candidate element comprising the first element is predefined in a codebook corresponding to a same rank, and when a quantity of the at least one candidate element is at least 2, and wherein for each candidate element among at least two candidate elements, those ports indicated by the candidate element are at least partially different to those ports of each other candidate element among the at least two candidate elements.

14. The terminal device according to claim 13, wherein when the rank is greater than 1, in the codebook corresponding to the same rank, any candidate element comprises a plurality of column vectors, each of the plurality of column vectors indicates at least two ports, and ports indicated by any two column vectors in a same candidate element are at least partially different.

15. The terminal device according to claim 13, wherein the first group of precoded reference signals corresponds to a first polarization direction, and the second group of precoded reference signals corresponds to a second polarization direction.

16. The terminal device according to claim 13, wherein the first indication information is a first precoding matrix indicator (PMI), and a one-to-one correspondence between at least one PMI and the at least one candidate element is pre-stored in the codebook.

17. The terminal device according to claim 16, wherein each column vector in the first element indicated by the first PMI indicates at least two of the plurality of precoding vectors, one of the at least two precoding vectors corresponds to one of the first group of precoded reference signals, and another one of the at least two precoding vectors corresponds to one of the second group of precoded reference signals.

18. The terminal device according to claim 13, wherein the method further comprises: receiving second indication information, wherein the second indication information indicates the CSI feedback-based transmission scheme.

* * * * *